United States Patent
Nahrwold et al.

(10) Patent No.: US 10,473,168 B2
(45) Date of Patent: Nov. 12, 2019

(54) BALL RETAINING BALL AND RAMP ASSEMBLY

(71) Applicant: Dana Automotive Systems Group, LLC, Maumee, OH (US)

(72) Inventors: Thomas L. Nahrwold, Napoleon, OH (US); Scott A. Smith, Maumee, OH (US)

(73) Assignee: Dana Automotive System Group, LLC, Maumee, OH (US)

( * ) Notice: Subject to any disclaimer, the term of this patent is extended or adjusted under 35 U.S.C. 154(b) by 36 days.

(21) Appl. No.: 15/701,690

(22) Filed: Sep. 12, 2017

(65) Prior Publication Data

US 2018/0080508 A1 Mar. 22, 2018

Related U.S. Application Data

(60) Provisional application No. 62/395,837, filed on Sep. 16, 2016.

(51) Int. Cl.
*F16D 27/115* (2006.01)
*F16D 15/00* (2006.01)
(Continued)

(52) U.S. Cl.
CPC ............ *F16D 27/115* (2013.01); *F16D 13/52* (2013.01); *F16D 15/00* (2013.01); *F16D 28/00* (2013.01);
(Continued)

(58) Field of Classification Search
CPC ........................... F16D 15/00; F16D 2023/123
See application file for complete search history.

(56) References Cited

U.S. PATENT DOCUMENTS

| 3,791,501 A | 2/1974 | Culbertson |
| 5,078,249 A | 1/1992 | Botterill |

(Continued)

FOREIGN PATENT DOCUMENTS

| DE | 3915959 A1 | 11/1990 |
| DE | 102007014831 A1 | 7/2007 |

(Continued)

OTHER PUBLICATIONS

Machine-generated English translation of DE102007014831, obtained via Espacenet Patent Search.

*Primary Examiner* — Jacob S. Scott
*Assistant Examiner* — James J Taylor, II
(74) *Attorney, Agent, or Firm* — Marshall & Melhorn, LLC

(57) ABSTRACT

A ball and ramp assembly including a first plate, a second plate and one or more rolling elements between the first and second plates. The first plate includes a shoulder portion that extends from a first side of the first plate. Additionally, the first plate includes an increased diameter portion that extends from an outer surface of the first plate. Extending inward from a second side of the first plate is a receiving portion with a substantially vertical wall portion having one or more non-circular first plate grooves. The second plate has one or more non-circular second plate grooves that extend along a first side of the second plate. The second plate grooves are a reverse mirror image of the first plate grooves. Radially outboard from the shoulder portion is a thrust bearing and integrally connected to the outer surface of the first plate is a first plate gear portion.

14 Claims, 15 Drawing Sheets

(51) Int. Cl.
  *F16D 13/52* (2006.01)
  *F16D 28/00* (2006.01)
  *F16D 23/12* (2006.01)
  *F16H 63/30* (2006.01)
  *F16H 48/34* (2012.01)
  *F16H 48/40* (2012.01)
  *F16H 48/08* (2006.01)
  *F16H 48/20* (2012.01)
  *F16H 48/22* (2006.01)

(52) U.S. Cl.
  CPC ....... *F16H 63/30* (2013.01); *F16D 2023/123* (2013.01); *F16H 48/22* (2013.01); *F16H 48/34* (2013.01); *F16H 48/40* (2013.01); *F16H 2048/082* (2013.01); *F16H 2048/204* (2013.01); *F16H 2048/343* (2013.01)

(56) References Cited

U.S. PATENT DOCUMENTS

| | | | |
|---|---|---|---|
| 5,106,349 A | 4/1992 | Botterill et al. | |
| 5,651,437 A | 7/1997 | Organek et al. | |
| 6,006,883 A * | 12/1999 | Husse | F16D 13/585 192/101 |
| RE36,502 E | 1/2000 | Organek et al. | |
| 6,019,694 A | 2/2000 | Forrest et al. | |
| 6,460,677 B1 | 10/2002 | Roscoe | |
| 6,758,782 B2 | 7/2004 | Matzschker et al. | |
| 6,827,663 B2 | 12/2004 | Tucker-Peake | |
| 9,033,126 B2 | 5/2015 | Strong | |
| 2005/0167229 A1* | 8/2005 | Tsukada | F16D 13/04 192/54.52 |
| 2008/0099300 A1* | 5/2008 | Youngwerth | F16D 43/10 192/103 A |
| 2008/0308380 A1* | 12/2008 | Youngwerth | F16D 43/10 192/83 |
| 2009/0107794 A1 | 4/2009 | Einboeck | |
| 2009/0127060 A1* | 5/2009 | Ishida | B62K 11/14 192/82 R |
| 2010/0089681 A1* | 4/2010 | Inomori | F16D 13/52 180/219 |
| 2010/0219034 A1 | 9/2010 | Wheals et al. | |
| 2016/0319890 A1* | 11/2016 | Jameson | F16D 23/12 |
| 2017/0045096 A1* | 2/2017 | Kishimoto | F16D 23/12 |
| 2017/0175823 A1* | 6/2017 | Cooper | F16D 23/12 |
| 2017/0314654 A1* | 11/2017 | Fuller | F16H 15/38 |

FOREIGN PATENT DOCUMENTS

| | | |
|---|---|---|
| JP | 01153841 A | 6/1989 |
| JP | 2006177458 A | 7/2006 |
| JP | 2007155057 A | 6/2007 |
| JP | 2009121645 A | 6/2009 |
| JP | 2013221541 A | 10/2013 |
| JP | 2014209017 A | 11/2014 |
| JP | 2016087758 A | 5/2016 |
| WO | 2007034208 A1 | 3/2007 |
| WO | WO-2017125135 A1 * | 7/2017 ............. F16D 11/14 |

* cited by examiner

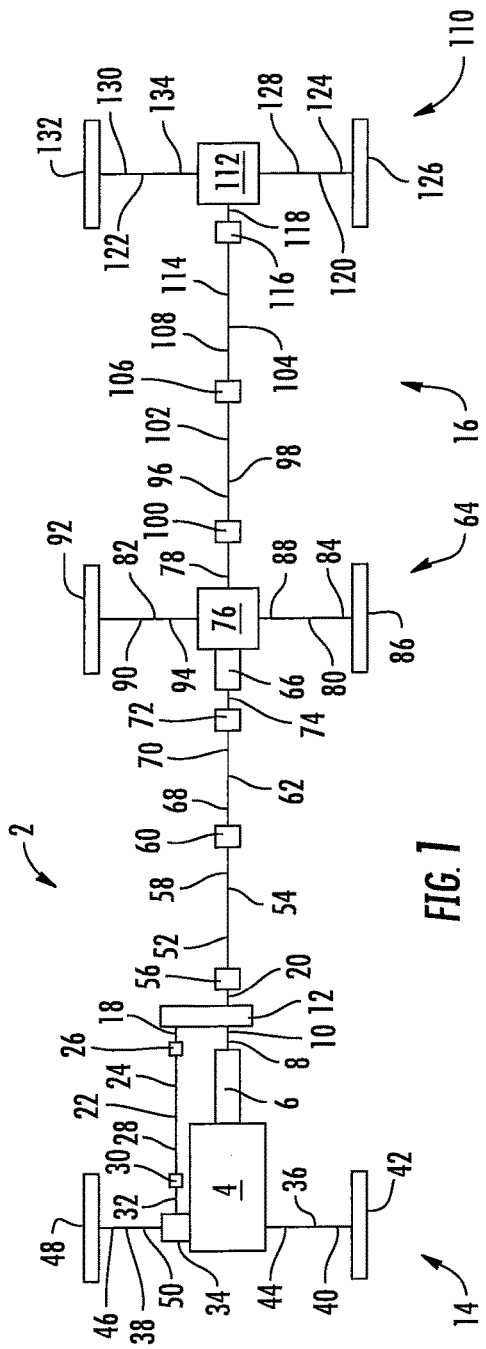
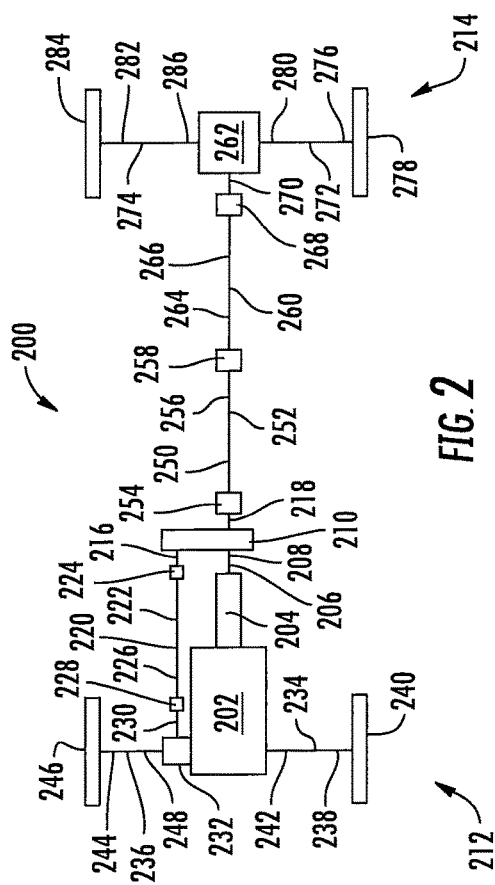
FIG. 1
FIG. 2

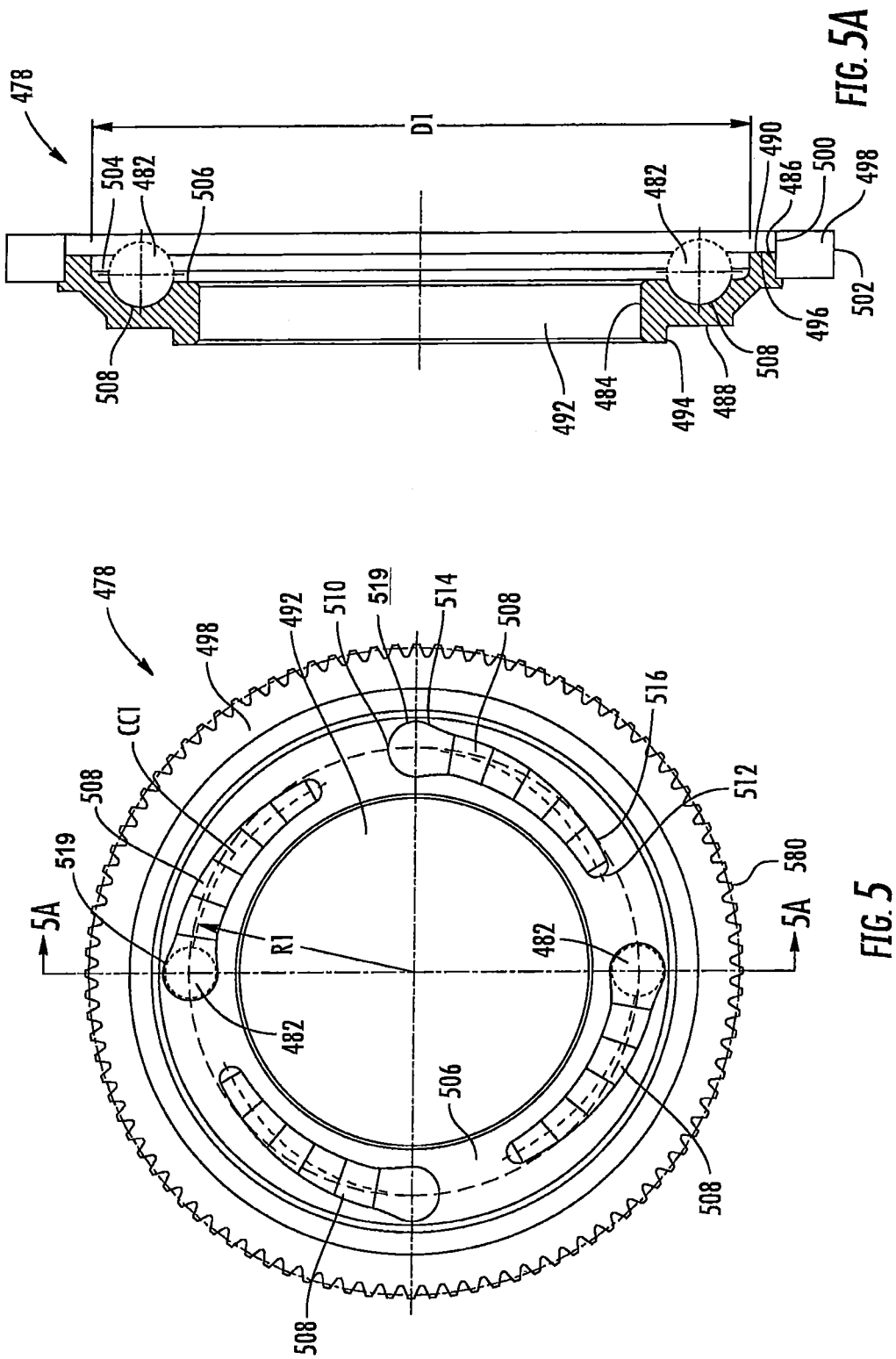

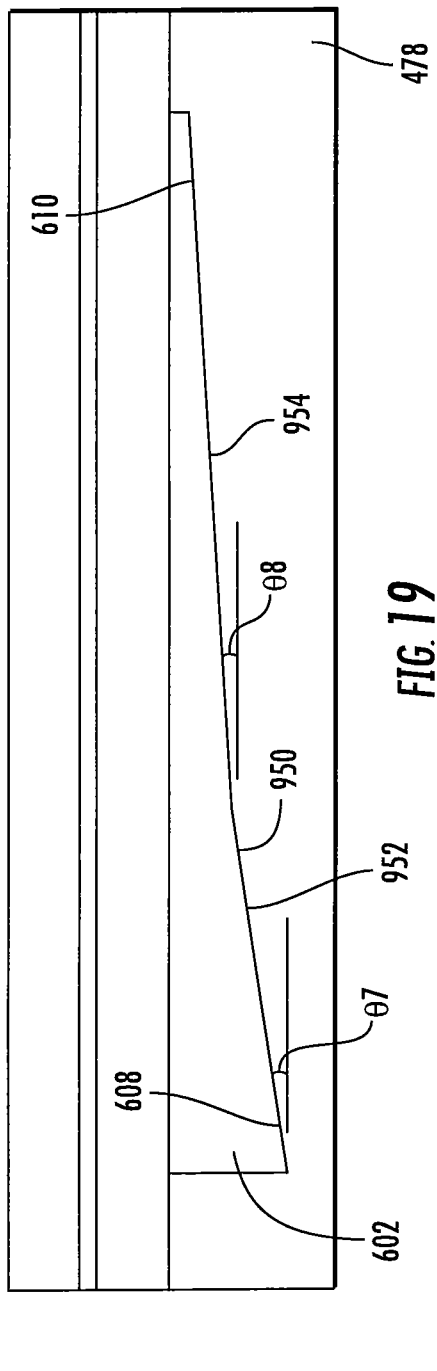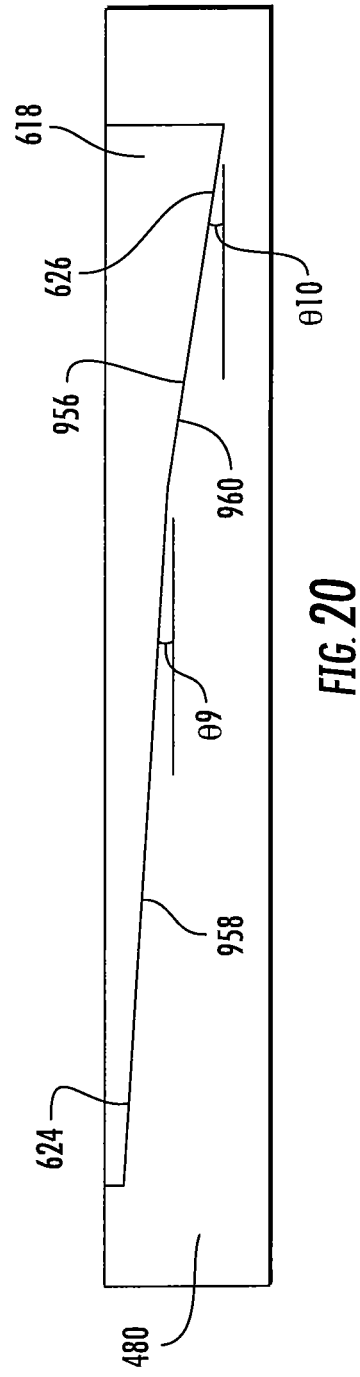

BALL RETAINING BALL AND RAMP ASSEMBLY

CROSS-REFERENCE TO RELATED APPLICATIONS

The present application claims the benefit to U.S. Provisional Patent Application No. 62/395,837 filed on Sep. 16, 2016, which is incorporated herein by reference in its entirety.

FIELD OF THE DISCLOSURE

The present disclosure relates to a ball and ramp assembly.

BACKGROUND OF THE DISCLOSURE

Conventional ball and ramp assemblies include the use of an actuating plate and a pressure plate with a plurality of rolling elements interposed between the actuating plate and pressure plate. Typically, the actuating plate and the pressure plate of the ball and ramp assemblies, include the use of one or more corresponding grooves of varying depth. The plurality of rolling elements of the ball and ramp assemblies are disposed within the one or more grooves in the actuating plate and the pressure plate. As the actuating plate and/or the pressure plate are radially rotated, the actuating plate is transmitted axially away from the pressure plate of the ball and ramp assembly. This allows the ball and ramp assembly to apply a varying amount of force onto a nearby component. Typically, the nearby component is a clutch pack assembly of a torque coupling unit that is attached to one or more differential output shafts.

Conventional ball and ramp assemblies suffer from the occurrence of a ball loss condition. The ball loss condition occurs when one or more of the plurality of rolling elements of the ball and ramp assemblies slip and/or fall out of their intended position toward their home or rest position. This results in an inconsistent application of force by the ball and ramp assemblies onto the nearby torque coupling unit thereby reducing the effectiveness of the torque coupling unit to operate as intended. It would therefore be advantageous to develop a ball and ramp assembly that resists and/or eliminates the ability of the ball and ramp assembly to experience a ball loss condition.

SUMMARY OF THE DISCLOSURE

A ball and ramp assembly for use in a motor vehicle. The ball and ramp assembly includes a first plate, a second plate and one or more rolling elements between the first and second plates. The first plate includes a shoulder portion that circumferentially extends from at least a portion of a first side of the first plate. Disposed radially outboard from at least a portion of the shoulder portion of the first plate is a thrust bearing. The first plate further includes an increased diameter portion that circumferentially extends from at least a portion of an outer surface of the first plate. Integrally connected to at least a portion of the outer surface and/or the increased diameter portion of the first plate is a first plate gear portion.

Extending inward from at least a portion of a second side of the first plate is a receiving portion with a substantially vertical wall portion. The substantially vertical wall portion has one or more first plate grooves that are non-circular in shape.

The second plate has one or more second plate grooves that extend along at least a portion of a first side of the second plate. The one or more second plate grooves of the second plate are a reverse mirror image of the one or more first plate grooves of the first plate.

BRIEF DESCRIPTION OF THE FIGURES

The above, as well as other advantages of the present disclosure, will become readily apparent to those skilled in the art from the following detailed description when considered in light of the accompanying drawings in which:

FIG. 1 is a schematic top-plan view of a vehicle having one or more ball and ramp assemblies according to an embodiment of the disclosure;

FIG. 2 is a schematic top-plan view of another vehicle having one or more ball and ramp assemblies according to an embodiment of the disclosure;

FIG. 5 is a schematic side-view of a first plate of the ball and assembly illustrated in FIGS. 3 and 4 according to an embodiment of the disclosure;

FIG. 5A is a schematic cross-sectional view of the first plate of the ball and ramp assembly illustrated in FIG. 5 along the line A-A;

FIG. 19 schematically illustrates the depth of the one or more first plate grooves of the first plate illustrated in FIGS. 10 and 12 according to an embodiment of the disclosure; and FIG. 20 schematically illustrates the depth of the one or more second plate grooves of the second plate illustrated in FIGS. 11 and 12 according to an embodiment of the disclosure.

DETAILED DESCRIPTION OF THE DISCLOSURE

Figure 3:
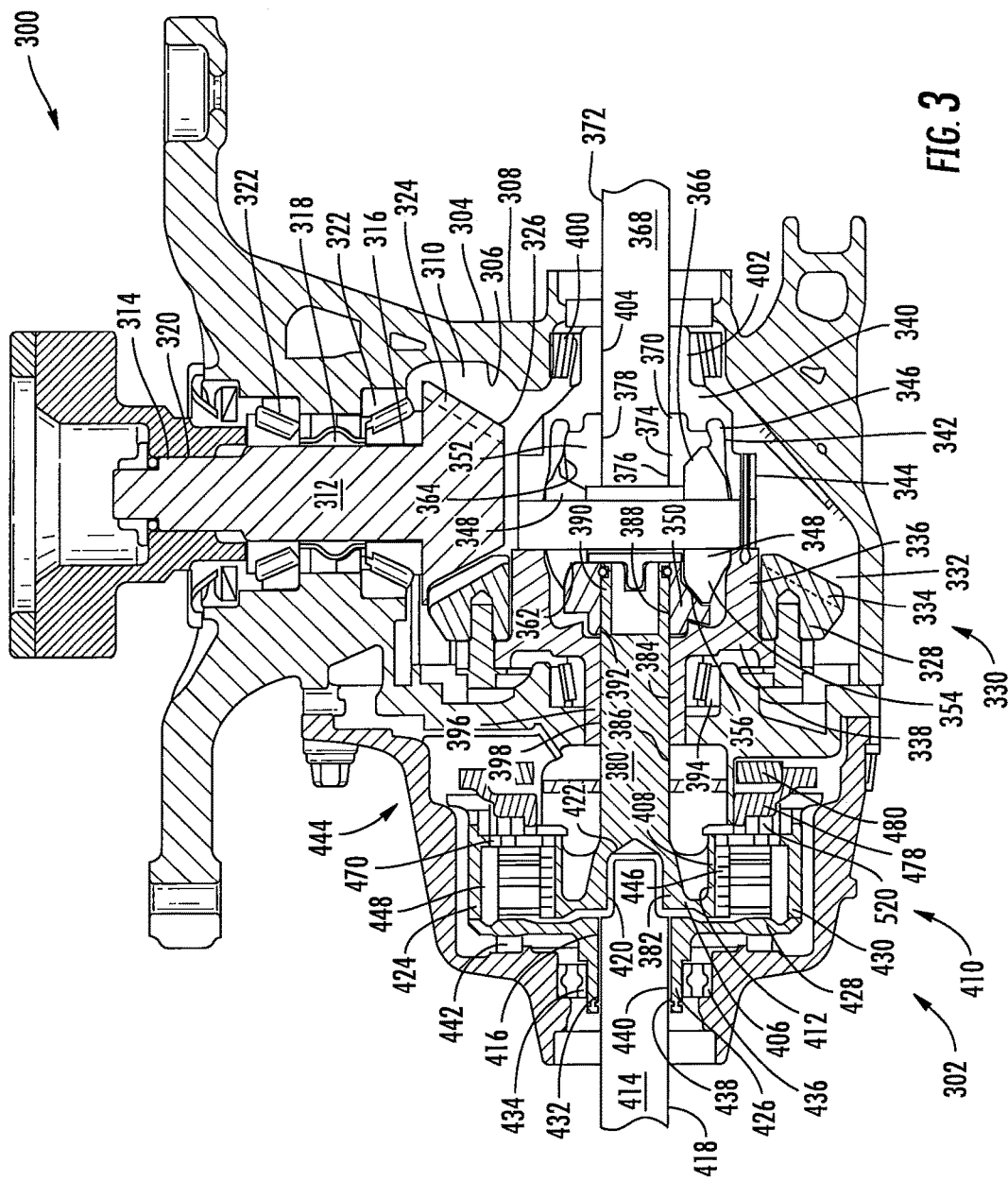
FIG. 3 is a cut-away schematic side-view of an axle system having a ball and ramp assembly according to an embodiment of the disclosure.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the ball and ramp assembly disclosed herein may be used in automotive, off-road vehicle, all-terrain vehicle, construction, structural, marine, aerospace, locomotive, military, machinery, robotic and/or consumer product applications. Additionally, as a non-limiting example, the ball and ramp assembly disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 2 having one or more ball and ramp assemblies according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational energy generated by the engine 4 by means of a gearbox.

The transmission output shaft 8 is drivingly connected to a transfer case input shaft 10, which in turn is drivingly connected to a transfer case 12. The transfer case 12 is used to transfer the rotational power from the transmission 6 to a front axle system 14 and a tandem axle system 16 by utilizing a series of gears and drive shafts. The transfer case 12 includes a first transfer case output 18 shaft and a second transfer case output shaft 20.

A first propeller shaft 22 extends from the first transfer case output shaft 18 to the front axle system 14 of the vehicle 2. A first end portion 24 of the first propeller shaft 22 is drivingly connected to an end of the first transfer case output shaft 18 opposite the transfer case 12 via a first coupling assembly 26. As a non-limiting example, the first coupling assembly 26 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 1 of the disclosure, second end portion 28 of the first propeller shaft 22 is drivingly connected to a second coupling assembly 30. As a non-limiting example, the second coupling assembly 30 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 30 is an end of a front axle system input shaft 32. As a non-limiting example, the front axle system input shaft 32 is a front axle differential input shaft, a coupling shaft, stub shaft or a front axle differential pinion shaft. Drivingly connected to an end of the front axle system input shaft 32 opposite the first propeller shaft 22 is a front axle differential 34. The front axle differential 34 is a set of gears that allows the outer drive wheel(s) of the wheeled vehicle to rotate at a faster rate that the inner drive wheel(s). It is within the scope of this disclosure that the front axle differential 34 may incorporate the use of one or more ball and ramp assemblies according to an embodiment of the disclosure. The rotational power is transmitted through the front axle system 14 as described in more detail below.

The front axle system 14 further includes a first front axle half shaft 36 and a second front axle half shaft 38. The first front axle half shaft 36 extends substantially perpendicular to the front axle system input shaft 32. A first end portion 40 of the first front axle half shaft 36 is drivingly connected to a first front axle wheel assembly 42 and a second end portion 44 of the first front axle half shaft 36 is drivingly connected to an end of the front axle differential 34. As a non-limiting example, the second end portion 44 of the first front axle half shaft 36 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 32 is the second front axle half shaft 38. A first end portion 46 of the second front axle half shaft 38 is drivingly connected to a second front axle wheel assembly 48. A second end portion 50 of the second front axle half shaft 38 is drivingly connected to an end of the front axle differential 34 opposite the first front axle half shaft 36. As a non-limiting example, the second end portion 50 of the second front axle half shaft 38 is drivingly connected to a front axle differential side gear, a separate stub shaft, a separate coupling shaft, a second front axle differential output shaft and/or a shaft that is formed as part of a front axle differential side gear.

An end of the second transfer case output shaft 20 is drivingly connected to an end of the transfer case 12 opposite the transfer case input shaft 10. As illustrated in FIG. 1 of the disclosure, a first end portion 52 of a second propeller shaft 54 is drivingly connected to an end of the second transfer case output shaft 20 opposite the transfer case 12 via a third coupling assembly 56. As non-limiting example, the third coupling assembly 56 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 1 of the disclosure, a second end portion 58 of the second propeller shaft 54 is drivingly connected to a fourth coupling assembly 60. As a non-limiting example, the fourth coupling assembly 60 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 60, opposite the second propeller shaft 54, is a third propeller shaft 62. The third propeller shaft 62 drivingly connects the transfer case 12 to a forward tandem axle system 64 of the tandem axle system 16 having an inter-axle differential 66. As illustrated in FIG. 1 of the disclosure, a first end portion 68 of the third propeller shaft 62 is drivingly connected to an end of the fourth coupling assembly 60 opposite the second propeller shaft 54. A second end portion 70 of the third propeller shaft 62 is drivingly connected to an end of a fifth coupling assembly 72. As a non-limiting example, the fifth coupling assembly 72 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fifth coupling assembly 72, opposite the third propeller shaft 62, is an end of a forward tandem axle system input shaft 74. An end of the forward tandem axle system input shaft 74, opposite the third propeller shaft 62, is drivingly connected to the inter-axle differential 66 of the forward tandem axle system 64. As a non-limiting example, the forward tandem axle system input shaft 74 is an inter-axle differential input shaft, a coupling shaft, stub shaft or an inter-axle differential pinion shaft. The inter-axle differential 66 is a device that divides the rotational power generated by the engine 4 between the axles in a vehicle 2. It is within the scope of this disclosure that the inter-axle differential 66 may incorporate the use of one or more ball and ramp assemblies according to an embodiment of the disclosure. The rotational power is transmitted through the forward tandem axle system 64 as described in more detail below.

As illustrated in FIG. 1 of the disclosure, the inter-axle differential 66 is drivingly connected to a forward tandem axle differential 76 and a forward tandem axle system output shaft 78. The forward tandem axle differential 76 is a set of gears that allows the outer drive wheel(s) of a wheeled vehicle to rotate at a faster rate than the inner drive wheel(s). It is within the scope of this disclosure that the forward tandem axle differential 76 may incorporate the use of one or more ball and ramp assemblies according to an embodiment of the disclosure.

The forward tandem axle system 64 further includes a first forward tandem axle half shaft 80 and a second forward tandem axle half shaft 82. The first forward tandem axle half shaft 80 extends substantially perpendicular to the forward tandem axle system input shaft 74. A first end portion 84 of the first forward tandem axle half shaft 80 is drivingly connected to a first forward tandem axle wheel assembly 86 and a second end portion 88 of the first forward tandem axle half shaft 80 is drivingly connected to an end of the forward tandem axle differential 76. As a non-limiting example, the second end portion 88 of the first forward tandem axle half shaft 80 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 74 is the second forward tandem axle half shaft 82. A first end portion 90 of the second forward tandem axle half shaft 82 is drivingly connected to a second forward tandem axle wheel assembly 92. A second end portion 94 of the second forward tandem axle half shaft 82 is drivingly connected to an end of the forward tandem axle differential 76 opposite the first forward tandem axle half shaft 80. As a non-limiting example, the second end portion 94 of the second forward tandem axle half shaft 82 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 78 is drivingly connected to a side of the inter-axle differential 66 opposite the third propeller shaft 62. An end of the forward tandem axle system output shaft 78, opposite the inter-axle differential 66, is drivingly connected to a first end portion 96 of a fourth propeller shaft 98 via a sixth coupling assembly 100. As a non-limiting example, the sixth coupling assembly 100 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 102 of the fourth propeller shaft 98 is drivingly connected to a fifth propeller shaft 104 via a seventh coupling assembly 106. As a non-limiting example, the seventh coupling assembly 106 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 1 of the disclosure, a first end portion 108 of the fifth propeller shaft 104 is drivingly connected to an end of the seventh coupling assembly 106 opposite the fourth propeller shaft 98. The fifth propeller shaft 104 drivingly connects the inter-axle differential 66 to a rear tandem axle system 110 having a rear tandem axle differential 112. As illustrated in FIG. 1 of the disclosure, a second end portion 114 of the fifth propeller shaft 104 is drivingly connected to an end of an eighth coupling assembly 116. As a non-limiting example, the eighth coupling assembly 116 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the eighth coupling assembly 116, opposite the fifth propeller shaft 104, is an end of a rear tandem axle system input shaft 118. As a non-limiting example, the rear tandem axle input shaft 118 is a rear tandem axle differential input shaft, a coupling shaft, stub shaft or a rear tandem axle differential pinion shaft. Drivingly connected to an end of the rear tandem axle input shaft 118, opposite the fifth propeller shaft 104, is the rear tandem axle differential 112. The rear tandem axle differential 112 is a set of gears that allows the outer drive wheel(s) of the wheeled vehicle to rotate at a faster rate that the inner drive wheel(s). It is within the scope of this disclosure that the rear tandem axle differential 112 may incorporate the use of one or more ball and ramp assemblies according to an embodiment of the disclosure. The rotational power is transmitted through the rear tandem axle system 110 as described in more detail below.

The rear tandem axle system 110 further includes a first rear tandem axle half shaft 120 and a second rear tandem axle half shaft 122. The first rear tandem axle half shaft 120 extends substantially perpendicular to the rear tandem axle system input shaft 118. A first end portion 124 of the first rear tandem axle half shaft 120 is drivingly connected to a first rear tandem axle wheel assembly 126 and a second end portion 128 of the first rear tandem axle half shaft 120 is drivingly connected to an end of the rear tandem axle differential 112. As a non-limiting example, the second end portion 128 of the first rear tandem axle half shaft 120 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 118 is the second forward tandem axle half shaft 122. A first end portion 130 of the second rear tandem axle half shaft 122 is drivingly connected to a second rear tandem axle wheel assembly 132. A second end portion 134 of the second rear tandem axle half shaft 122 is drivingly connected to an end of the rear tandem axle differential 122 opposite the first rear tandem axle half shaft 120. As a non-limiting example, the second end portion 134 of the second rear tandem axle half shaft 122 is drivingly connected to a rear tandem axle differential side gear, a separate stub shaft, a separate coupling shaft, a second rear tandem axle differential output shaft and/or a shaft that is formed as part of a rear tandem axle differential side gear.

FIG. 2 is a schematic top-plan view of a vehicle 200 having one or more ball and ramp assemblies according to an embodiment of the disclosure. The vehicle 200 has an engine 202 which is drivingly connected to a transmission 204. A transmission output shaft 206 is then drivingly connected to an end of the transmission 204 opposite the engine 202. The transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a rear axle system 214 by utilizing a series of gears and drive shafts. The transfer case 210 includes a first transfer case output 216 shaft and a second transfer case output shaft 218.

A first propeller shaft 220 extends from the first transfer case output shaft 216 to the front axle system 212 of the vehicle 200. A first end portion 222 of the first propeller shaft 220 is drivingly connected to an end of the first transfer case output shaft 216 opposite the transfer case 210 via a first coupling assembly 224. As a non-limiting example, the first coupling assembly 224 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 2 of the disclosure, a second end portion 226 of the first propeller shaft 220 is drivingly connected to a second coupling assembly 228. As a non-limiting example, the second coupling assembly 228 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 228 is an end of a front axle system input shaft 230. As a non-limiting example, the front axle system input shaft 230 is a front axle differential input shaft, a coupling shaft, stub shaft or a front axle differential pinion shaft. Drivingly connected to an end of the front axle system input shaft 230, opposite the first propeller shaft 220, is a front axle differential 232. The front axle differential 232 is a set of gears that allows the outer drive wheel(s) of the wheeled vehicle to rotate at a faster rate that the inner drive wheel(s). It is within the scope of this disclosure that the front axle differential 232 may incorporate the use of one or more ball and ramp assemblies according to an embodiment of the disclosure. The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. A first end portion 238 of the first front axle half shaft 234 is drivingly connected to a first front axle wheel assembly 240 and a second end portion 242 of the first front axle half shaft 234 is drivingly connected to an end of the front axle differential 232. As a non-limiting example, the second end portion 242 of the first front axle half shaft 234 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 230 is the second front axle half shaft 236. A first end portion 244 of the second front axle half shaft 236 is drivingly connected to a second front axle wheel assembly 246. A second end portion 248 of the second front axle half shaft 236 is drivingly connected to an end of the front axle differential 232 opposite the first front axle half shaft 234. As a non-limiting example, the second end portion 248 of the second front axle half shaft 236 is drivingly connected to a front axle differential side gear, a separate stub shaft, a separate coupling shaft, a second front axle differential output shaft and/or a shaft that is formed as part of a front axle differential side gear.

An end of the second transfer case output shaft 218 is drivingly connected to an end of the transfer case 210 opposite the transfer case input shaft 208. As illustrated in FIG. 2 of the disclosure, a first end portion 250 of a second propeller shaft 252 is drivingly connected to an end of the second transfer case output shaft 218 opposite the transfer case 210 via a third coupling assembly 254. As non-limiting example, the third coupling assembly 254 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 2 of the disclosure, a second end portion 256 of the second propeller shaft 252 is drivingly connected to a fourth coupling assembly 258. As a non-limiting example, the fourth coupling assembly 258 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 258, opposite the second propeller shaft 252, is a third propeller shaft 260. The third propeller shaft 260 drivingly connects the transfer case 210 to a rear differential 262 of the rear axle system 214. As illustrated in FIG. 2 of the disclosure, a first end portion 264 of the third propeller shaft 260 is drivingly connected to an end of the fourth coupling assembly 258 opposite the second propeller shaft 252. A second end portion 266 of the third propeller shaft 260 is drivingly connected to an end of a fifth coupling assembly 268. As a non-limiting example, the fifth coupling assembly 268 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fifth coupling assembly 268, opposite the third propeller shaft 260, is an end of a rear axle system input shaft 270. An end of the rear axle system input shaft 270, opposite the third propeller shaft 260, is drivingly connected to the rear differential 262 of the rear axle system 214. As a non-limiting example, the rear axle system input shaft 270 is a rear differential input shaft, a coupling shaft, stub shaft or a rear axle differential pinion shaft. The rear axle differential 262 is a set of gears that allows the outer drive wheel(s) of the wheeled vehicle to rotate at a faster rate that the inner drive wheel(s). It is within the scope of this disclosure that the rear axle differential 262 may incorporate the use of one or more ball and ramp assemblies according to an embodiment of the disclosure. The rotational power is transmitted through the rear axle system 214 as described in more detail below.

The rear axle system 214 further includes a first rear axle half shaft 272 and a second rear axle half shaft 274. The first rear axle half shaft 272 extends substantially perpendicular to the rear axle system input shaft 270. A first end portion 276 of the first rear axle half shaft 272 is drivingly connected to a first rear axle wheel assembly 278 and a second end portion 280 of the first rear axle half shaft 272 is drivingly connected to an end of the rear axle differential 262. As a non-limiting example, the second end portion 280 of the first rear axle half shaft 272 is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 270 is the second rear axle half shaft 274. A first end portion 282 of the second rear axle half shaft 274 is drivingly connected to a second rear axle wheel assembly 284. A second end portion 286 of the second rear axle half shaft 274 is drivingly connected to an end of the rear axle differential 262 opposite the first rear axle half shaft 272. As a non-limiting example, the second end portion 286 of the second rear axle half shaft 274 is drivingly connected to a rear axle differential side gear, a separate stub shaft, a separate coupling shaft, a second rear axle differential output shaft and/or a shaft that is formed as part of a rear axle differential side gear.

FIGS. 3-9 schematically illustrate an axle system 300 having a ball and ramp assembly 302 according to an embodiment of the disclosure. As best seen in FIG. 3 of the disclosure, the axle system 300 includes a housing 304 having an inner surface 306 and an outer surface 308 defining a hollow portion 310 therein. It is within the scope of this disclosure and as a non-limiting example, that axle system 300 is a front axle system, a rear axle system, a forward tandem axle system and/or a rear tandem axle system.

An input shaft 312 having a first end portion 314, a second end portion 316, an intermediate portion 318 and an outer surface 320 is at least partially disposed within the hollow portion 310 of the housing 304 of the axle system 300. As illustrated in FIG. 3 of the disclosure, at least a portion of the first end portion 314 of the input shaft 312 of the axle system 300 extends outside the housing 304 of the axle system 300. At least a portion of the intermediate portion 318 of the input shaft 312 is rotationally supported within the hollow interior portion 310 of the housing 304 of the axle system 300 by using one or more bearing assemblies 322. It is within the scope of this disclosure and as a non-limiting example, that the one or more bearing assemblies 322 may be one or more tapered roller bearing assemblies. A plurality of input shaft gear teeth 324 circumferentially extend from at least a portion of the outer surface 320 of an increased diameter portion 326 of the second end portion 316 of the input shaft 312. In accordance with an embodiment of the disclosure and as a non-limiting example, the input shaft 312 is a pinion shaft, a differential pinion shaft, a front axle input shaft, a rear axle input shaft, a forward tandem axle input shaft and/or a rear tandem axle input shaft.

Drivingly engaged with the input shaft 312 is a ring gear 328 of a differential assembly 330. Circumferentially extending along at least a portion of an outer surface 332 of the ring gear 328 of the differential assembly 330 is a plurality of ring gear teeth 334. As illustrated in FIG. 3 of the disclosure, the plurality of ring gear teeth 334 on the outer surface 332 of the ring gear 328 are complementary to and meshingly engaged with the plurality of input shaft gear teeth 324 on the outer surface 320 of the second end portion 316 of the input shaft 312.

Integrally connected to at least a portion of the ring gear 328 of the differential assembly 330 is a differential case 336 having a first end portion 338, a second end portion 340, an inner surface 342 and an outer surface 344. The inner surface 342 and the outer surface 344 of the differential case 336 defines a hollow portion 346 therein. It is within the scope of this disclosure and as a non-limiting example that the differential case 336 of the differential assembly 330 may be made up of one or more pieces that are integrally connected to one another to form the differential case 336 illustrated in FIG. 3 of the disclosure. As a non-limiting example, the ring gear 328 may be integrally connected to the differential case 336 by using one or more mechanical fasteners, one or more welds and/or one or more adhesives.

Disposed within the hollow portion 346 of the differential case 336 is a differential gear set comprising one or more pinion gears 348, a first side gear 350 and a second side gear 352. Circumferentially extending along at least a portion of an outer surface 354 of the one or more pinion gears 348 is a plurality of pinion gear teeth 356.

Figure 4:
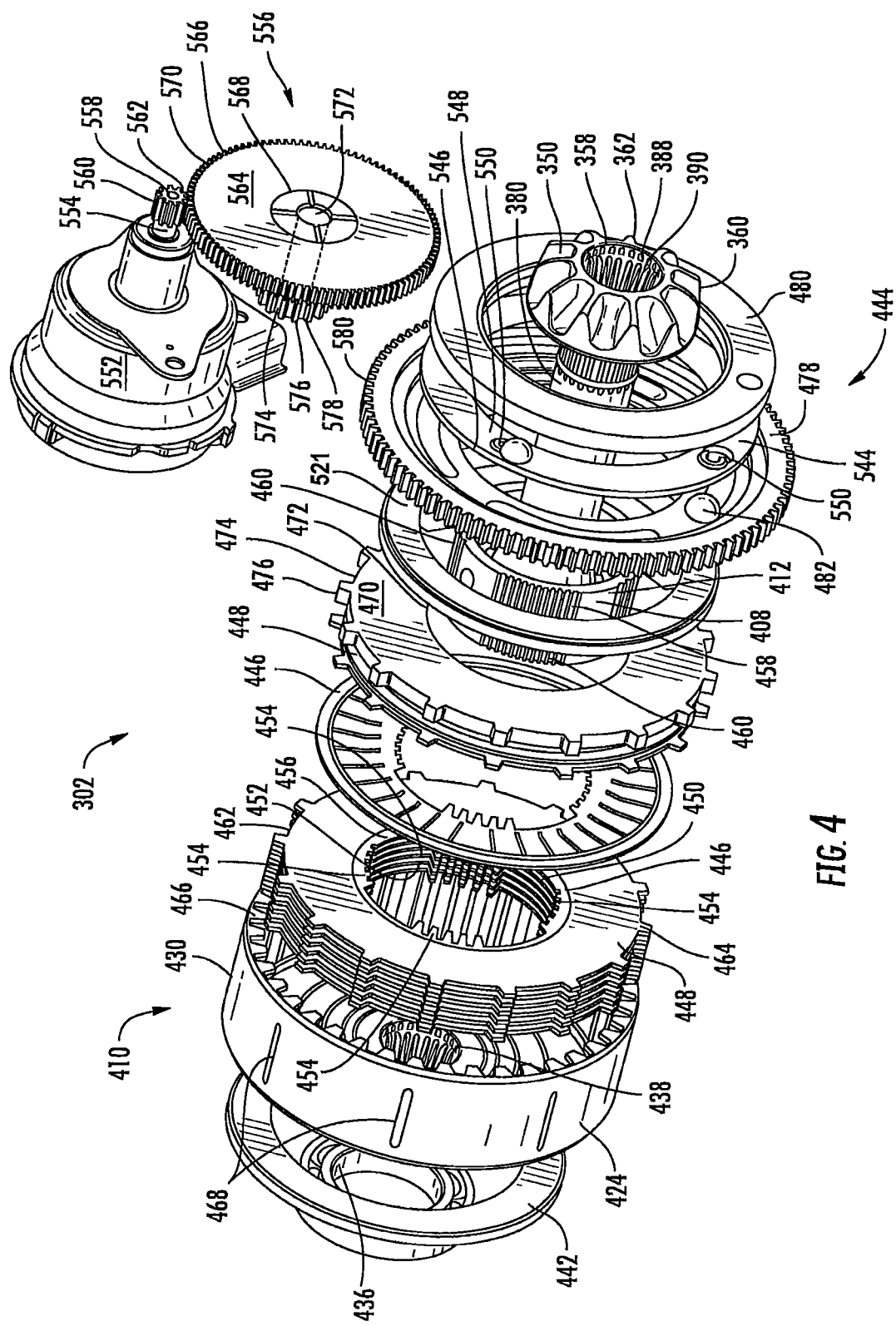
FIG. 4 is an exploded view of the ball and ramp assembly illustrated in FIG. 3 according to an embodiment of the disclosure.

As best seen in FIG. 4 of the disclosure, the first side gear 350 has an inner surface 358 and an outer surface 360. Circumferentially extending along at least a portion of the outer surface 360 of the first side gear 350 of the differential assembly 330 is a plurality of first side gear teeth 362. The plurality of first side gear teeth 362 on the outer surface 360 of the first side gear 350 are complementary to and meshingly engaged with the plurality of pinion gear teeth 356 on the outer surface 354 of the one or more pinion gears 348 of the differential assembly 330.

Circumferentially extending along at least a portion of an outer surface 364 of the second side gear 352 of the differential assembly 330 is a plurality of second side gear teeth 366. The plurality of second side gear teeth 366 on the outer surface 364 of the second side gear 352 of the differential assembly 330 are complementary to and meshingly engaged with the plurality of pinion gear teeth 356 on the outer surface 354 of the one or more pinion gears 348 of the differential assembly 330.

Extending co-axially with and drivingly engaged with the second side gear 352 of the differential assembly 330 is a second shaft 368 having a first end portion 370, a second end portion (not shown) and an outer surface 372. It is within the scope of this disclosure and as a non-limiting example, that the second shaft 368 may be a coupling shaft, a stub shaft, a second axle system output shaft, a second differential assembly output shaft or a second axle half shaft.

Circumferentially extending along at least a portion of the first end portion 370 of the second shaft 368 is a plurality of axially extending second shaft splines 374. The plurality of axially extending second shaft splines 374 are complementary to and meshingly engaged with a plurality of axially extending second side gear splines 376 circumferentially extending along at least a portion of an inner surface 378 of the second side gear 352 of the differential assembly 330. According to an embodiment of the disclosure (not shown) and as a non-limiting example, the second side gear of the differential assembly may be integrally formed as part of the first end portion of the second shaft of the axle assembly. In accordance with an alternative embodiment of the disclosure (not shown) and as a non-limiting example, at least a portion of the first end portion of the second shaft may be integrally connected to at least a portion of the inner surface of the second side gear by using one or more welds, one or more adhesives, one or more mechanical fasteners and/or a threaded connection.

Extending co-axially with and drivingly connected to the first side gear 350 of the differential assembly 330 is a stub shaft 380 having a first end portion 382, a second end portion 384 and an outer surface 386. Circumferentially extending along at least a portion of the outer surface 386 of the second end portion 384 of the stub shaft 380 is a plurality of axially extending stub shaft splines 388. The plurality of axially extending stub shaft splines 388 are complementary to and meshingly engaged with a plurality of axially extending first side gear splines 390 circumferentially extending along at least a portion of an inner surface 392 of the first side gear 350 of the differential assembly 330. According to an embodiment of the disclosure (not shown) and as a non-limiting example, the second end portion of the stub shaft is integrally formed as part of the first side gear of the differential assembly. In accordance with an alternative embodiment of the disclosure (not shown) and as a non-limiting example, at least a portion of the second end portion of the stub shaft is integrally connected to at least a portion of the first side gear by using one or more welds, one or more mechanical fasteners, one or more adhesives and/or a threaded connection.

At least a portion of the first end portion 338 of the differential case 336 is rotationally supported within the hollow portion 310 of the housing 304 by a first differential case bearing assembly 394. According to the embodiment of the disclosure illustrated in FIG. 3 and as a non-limiting example, a first axially extending portion 396 extends axially outboard from at least a portion of the first end portion 338 of the differential case 336 away from the first side gear 350. In accordance with the embodiment of the disclosure illustrated in FIG. 3 and as a non-limiting example, at least a portion of the first differential case bearing assembly 394 is interposed between the inner surface 306 of the housing 304 and the outer surface 344 of the first axially extending portion 396 of the differential case 336. As a non-limiting example, the first differential case bearing assembly 394 is a tapered roller bearing assembly. Additionally, as a non-limiting example, the first axially extending portion 396 of the differential case 336 is substantially cylindrical in shape.

As illustrated in FIG. 3 of the disclosure and as a non-limiting example, the first axially extending portion 396 of the differential case 336 includes a hollow interior portion 398. The hollow interior portion 398 of the first axially extending portion 396 of the differential case 336 is of a size and shape to receive and/or retain at least a portion of the stub shaft 380 of the axle system 300. It is within the scope of this disclosure that the first axially extending portion 396 of the differential case 336 may provide rotational support for at least a portion of the stub shaft 380 of the axle system 300.

At least a portion of the second end portion 340 of the differential case 336 is rotationally supported within the hollow portion 310 of the housing 304 by a second differential case bearing assembly 400. According to an embodiment of the disclosure illustrated in FIG. 3 and as a non-limiting example, a second axially extending portion 402 extends axially outboard from at least a portion of the second end portion 340 of the differential case 336 away from the second side gear 352. In accordance with the embodiment of the disclosure illustrated in FIG. 3 and as a non-limiting example, at least a portion of the second differential case bearing assembly 400 is interposed between the inner surface 306 of the housing 304 and the outer surface 344 of the second axially extending portion 402 of the differential case 336. As a non-limiting example, the second differential case bearing assembly 400 is a tapered roller bearing assembly. Additionally, as a non-limiting example, the second axially extending portion 402 of the differential case 336 is substantially cylindrical in shape.

In accordance with the embodiment of the disclosure illustrated in FIG. 3 and as a non-limiting example, the second axially extending portion 402 of the differential case 336 includes a hollow interior portion 404. The hollow interior portion 404 of the second axially extending portion 402 of the differential case 336 is of a size and shape to receive and/or retain at least a portion of the second shaft 368 of the differential assembly 330. It is within the scope of this disclosure that the second axially extending portion 402 of the differential case 336 may provide rotational support for at least a portion of the second shaft 368 of the differential assembly 330.

Extending radially outboard from at least a portion of the first end portion 382 of the stub shaft 380 is a radially extending portion 406 of a clutch can 408 of a clutch pack assembly 410. An axially extending portion 412 of the clutch can 408 extends axially inboard from an end of the radially extending portion 406 of the clutch can 408 toward the differential case 336 of the differential assembly 330. According to the embodiment of the disclosure illustrated in FIG. 3 and as a non-limiting example, the clutch can 408 of the clutch pack 410 is integrally formed as part of the first end portion 382 of the stub shaft 380 of the axle system 300. In accordance with an alternative embodiment of the disclosure (not shown) and as a non-limiting example, the radially extending portion of the clutch can may be a separate component from the stub shaft and may be integrally connected to at least a portion of the first end portion of the stub shaft by using one or more welds, one or more mechanical fasteners, one or more adhesives, a splined connection and/or a threaded connection. According to a further embodiment of the disclosure (not shown) and as a non-limiting example, the radially extending portion and the axially extending portion of the clutch can may be separate components that are integrally connected to one another by using one or more welds, one or more mechanical fasteners, one or more adhesives, a splined connection and/or a threaded connection.

Rotationally connected to at least a portion of the first end portion 382 of the stub shaft 380 is a first shaft 414 having a first end portion (not shown), a second end portion 416 and an outer surface 418. As best seen in FIG. 3 of the disclosure, at least a portion of the first end portion 416 of first shaft 414 includes a reduced diameter portion 420 that is at least partially received within a first shaft receiving portion 422 of the first end portion 382 of the stub shaft 380. In accordance with an embodiment of the disclosure (not shown), at least a portion of the reduced diameter portion of the second end portion of the first shaft is received within a first shaft bearing disposed within the first shaft receiving portion in the first end portion of the stub shaft. As a non-limiting example that the first shaft 414 may be a coupling shaft, a second stub shaft, a first differential assembly output shaft, a first axle system output shaft or a first axle half shaft.

Disposed at least partially radially outboard from and drivingly connected with the first shaft 414 is a clutch drum 424 having a first axially extending portion 426, radially extending portion 428, a second axially extending portion 430 and inner surface 432 and an outer surface 434. Interposed between the outer surface 434 of the first axially extending portion 426 of the clutch drum 424 and the inner surface 306 of the housing 304 is a clutch drum bearing assembly 436. The clutch drum bearing assembly 436 provides rotational support for at least a portion of the cutch drum 424 within the hollow portion 310 of the housing 304 of the axle system 300. It is within the scope of this disclosure and as a non-limiting example that the clutch drum bearing assembly 436 may be a tapered roller bearing assembly or a roller bearing assembly.

Circumferentially extending along at least a portion of the inner surface 432 of the clutch drum 424 is a plurality of axially extending first clutch drum splines 438. The plurality of axially extending first clutch drum splines 438 are complementary to and meshingly engaged with a plurality of axially extending first shaft splines 440 circumferentially extending along at least a portion of the outer surface 418 of the first shaft 414. In accordance with an alternative embodiment of the disclosure (not shown) and as a non-limiting example, the first axially extending portion of the clutch drum may be integrally formed as part of the first shaft of the axle system.

Interposed between the outer surface 434 of the radially extending portion 428 of the clutch drum 424 and the inner surface 306 of the housing 304 is a first thrust bearing assembly 442. According to the embodiment of the disclosure illustrated in FIG. 3 and as a non-limiting example, the first thrust bearing 442 is disposed axially and radially offset from the clutch drum bearing assembly 436. When in operation, the first thrust bearing 442 of the clutch pack 410 provides rotational support for the clutch drum 424 when a load or an amount of force is applied to the clutch pack 410 by a ball and ramp assembly 444.

As best seen in FIG. 3 of the disclosure, the second axially extending portion 430 of the clutch drum 424 extends from an end of the radially extending portion 428 of the clutch drum 424 opposite the first axially extending portion 426. In accordance with the embodiment of the disclosure illustrated in FIG. 3 and as a non-limiting example, at least a portion of the second axially extending portion 430 of the clutch drum 424 is disposed radially outboard from and extends co-axially with the axially extending portion 412 of the clutch can 408.

Interposed between the second axially extending portion 430 of the clutch drum 424 and the axially extending portion 412 of the clutch can 408 is a first set of clutch plates 446 and a second set of clutch plates 448 that are interleafed with one another. As illustrated in FIG. 3 of the disclosure, the first plurality of clutch plates 446 are drivingly connected with the axially extending portion 412 of the clutch can 408 and the second plurality of clutch plates 448 are drivingly connected to the second axially extending portion 430 of the clutch drum 424. In accordance with an embodiment of the disclosure and as a non-limiting example, the first and the second plurality of clutch plates 446 and 448 are substantially disk-shaped.

Extending radially inboard from at least a portion of an inner surface 450 of the first plurality of clutch plates 446 is a plurality of protrusions 452. In accordance with the embodiment of the disclosure illustrated in FIG. 4 and as a non-limiting example, the plurality of protrusions 452 extending from the inner surface 450 of the first plurality of clutch plates 446 may be grouped together in one or more groups of protrusions 454. As best seen in FIG. 4 of the disclosure, the portions of the inner surface 450 of the first plurality of clutch plates 446, between the one or more groups of protrusions 454, defines one or more portions 456 without protrusions. In a non-limiting example, the plurality of protrusions 452 extending from the inner surface 450 of the first plurality of clutch plates 446 are substantially trapezoidal in shape.

The plurality of protrusions 452 of the first plurality of clutch plates 446 are drivingly connected to and slidingly engaged with the outer surface 386 of the axially extending portion 412 of the clutch can 408. As illustrated in FIG. 3 of the disclosure, the plurality of protrusions 452 of the first plurality of clutch plates 446 are meshingly engaged with a plurality of axially extending grooves 458 circumferentially extending along at least a portion of the outer surface 386 of the axially extending portion 412 of the clutch can 408. In accordance with the embodiment of the disclosure where the plurality of protrusions 452 of the first plurality of clutch plates 446 in one or more groups of protrusions 454, the plurality of axially extending grooves 458 are grouped into one or more groups of grooves 460. As a non-limiting example, the plurality of axially extending grooves 458 on the outer surface 386 of the axially extending portion 412 of the clutch can 408 are substantially trapezoidal in shape.

Extending radially outboard from at least a portion of an outer surface 462 of the second plurality of clutch plates 448 is a plurality of protrusions 464. The plurality of protrusions 464 on the outer surface 462 of the second plurality of clutch plates 448 are drivingly connected to and slidingly engaged with the inner surface 432 of the second axially extending portion 430 of the clutch drum 424. As illustrated in FIG. 3 of the disclosure, the plurality of protrusions 464 of the second plurality of clutch plates 448 are meshingly engaged with a plurality of axially extending grooves 466 circumferentially extending along at least a portion of the inner surface 432 of the second axially extending portion 430 of the clutch drum 424. As a non-limiting example, the plurality of protrusions 464 and/or the plurality of grooves 466 on the inner surface 432 of the second axially extending portion 430 of the clutch drum 424 are substantially trapezoidal in shape.

One or more apertures 468 extend from the inner surface 432 to the outer surface 434 of the second axially extending portion 430 of the clutch drum 424. As a non-limiting example that the one or more apertures 468 in the second axially extending portion 430 of the clutch drum 424 are used to reduce the overall amount of weight of the axle system 300 and/or to allow an amount of lubrication fluid (not shown) to flow through the clutch pack 410.

Disposed directly adjacent to and axially inboard from the first and second plurality of clutch plates 446 and 448 of the clutch pack 410 is a pressure plate 470 having an inner surface 472 and an outer surface 474. As illustrated in FIG. 3 of the disclosure, at least a portion of the pressure plate 470 is interposed between the second axially extending portion 430 of the clutch drum 424 and the axially extending portion 412 of the clutch can 408 of the clutch pack 410. When in operation, the pressure plate 470 allows the ball and ramp assembly 444 to apply a substantially equal amount of force across the surface of the first and second plurality of clutch plates 446 and 448 of the clutch pack 410.

Circumferentially extending radially outward along at least a portion of the outer surface 474 of the pressure plate 470 is a plurality of protrusions 476. The plurality of protrusions 476 on the outer surface 474 of the pressure plate 470 are complementary to and meshingly engaged with the plurality of plurality of grooves 466 on the inner surface 432 of the second axially extending portion 430 of the clutch drum 424. As a result, it is to be understood that the pressure plate 470 is slidingly engaged with the clutch drum 424 of the clutch pack 410.

Disposed directly adjacent to and axially inboard from the pressure plate 470 is the ball and ramp assembly 444. In accordance with the embodiment of the disclosure illustrated in FIG. 3 and as a non-limiting example, the ball and ramp assembly 444 is interposed between the pressure plate 470 and the ring gear 328 of the differential assembly 330. When in operation, the ball and ramp assembly 444 applies a varying amount of force onto the first and second plurality of clutch plates 446 and 448 of the clutch pack 410 allowing the first shaft 414 and the second shaft 368 to have a different angular velocity. As illustrated in FIGS. 3 and 4 of the disclosure, the ball and ramp assembly 444 includes a first plate 478, a second plate 480 and one or more rolling elements 482 interposed between the first and second plates 478 and 480 of the ball and ramp assembly 444.

As illustrated in FIGS. 5 and 5A of the disclosure, the first plate 478 of the ball and ramp assembly 444 has an inner surface 484, an outer surface 486, a first side 488 and a second side 490. The inner surface 484 and the outer surface 486 of the first plate 478 of the ball and ramp assembly 444 defines a hollow portion 492 therein. Circumferentially extending from at least a portion of the first side 488 of the first plate 478 of the ball and ramp assembly 444 is a shoulder portion 494.

Circumferentially extending along at least a portion of the outer surface 486 of the first plate 478 of the ball and ramp assembly 444 is an increased diameter portion 496. Directly adjacent to the increased diameter portion 496 of the first plate 478 of the ball and ramp assembly 444 is a first plate gear portion 498 having an inner surface 500 and an outer surface 502. At least a portion of the first plate gear portion 498 is integrally connected to at least a portion of the outer surface 486 and/or the increased diameter portion 496 of the first plate 478 of the ball and ramp assembly 444. As a non-limiting example, the first plate gear portion 498 may be integrally connected to the first plate 478 of the ball and ramp assembly 444 by using one or more welds, one or more mechanical fasteners, one or more adhesives, a threaded connection and/or a press-fit connection. The increased diameter portion 496 of the first plate 478 ensures that the first plate gear portion 498 is assembled in the proper location with respect to the first plate 478 and provides a surface for the attaching the first plate gear portion 498 to the first plate 478. In accordance with an alternative embodiment of the disclosure (not shown), the first plate gear portion may be integrally formed as part of the first plate of the ball and ramp assembly.

Extending inward from at least a portion of the second side 490 of the first plate 478 toward the first side 488 is a receiving portion 504 that terminates in a substantially vertical wall portion 506. The receiving portion 504 has a diameter D1 that is greater than an outer diameter OD1 of the second plate 480 of the ball and ramp assembly 444. As illustrated in FIG. 3 of the disclosure, when the ball and ramp assembly 444 is assembled, at least a portion of the second plate 480 is disposed within the receiving portion 504 of the first plate 498 of the ball and ramp assembly 444.

The first plate 478 of the ball and ramp assembly 444 has one or more first plate grooves 508 with a variable depth that extend along at least a portion of the substantially vertical wall portion 506 of the first plate 478. As illustrated in FIG. 5 of the disclosure, the one or more first plate grooves 508 have a first end 510, a second end 512, first end portion 514 and a second end portion 516. In accordance with the embodiment of the disclosure illustrated in FIG. 5 and as a non-limiting example, the one or more first plate grooves 508 have a variable width that decreased from the first end portion 514 to the second end portion 516 of the one or more first plate grooves 508. Additionally, in accordance with an embodiment of the disclosure and as a non-limiting example, the depth of the one or more first plate grooves 508 decreases from the first end portion 514 to the second end portion 516 of the one or more first plate grooves 508.

As illustrated in FIG. 5 of the disclosure and as a non-limiting example, the first end portion 514 of the one or more first plate grooves 508 has a substantially circular portion 519. The substantially circular portion 519 of the one or more first plate grooves 508 define a home or rest position for the one or more rolling elements of the ball and ramp assembly 444. According to an embodiment of the disclosure and as a non-limiting example, the substantially circular portion 519 of the one or more first plate grooves 508 has a diameter that is substantially equal to or slightly greater than an outer diameter of the one or more rolling elements 482 of the ball and ramp assembly 444.

In accordance with the embodiment of the disclosure illustrated in FIG. 5 and as a non-limiting example, the one or more first plate grooves 508 have a non-circular shape. As illustrated in FIG. 5 of the disclosure, the one or more first plate grooves 508 have center of curvature CC1 with a radius R1 that decreases from the first end portion 514 to the second end portion 516 of the one or more first plate grooves 508. It is within the scope of this disclosure and as a non-limiting example that the one or more first plate grooves 508 of the first plate 478 of the ball and ramp assembly 444 may have an elliptical-shape, a spiral-shape, an eccentric-shape and/or a non-circular shape with a radius that is defined by a general function of the angular location (e.g. sinusoidal, polynomial, linear, piecewise continuous/multi-linear, logarithmic, etc.) of the one or more first plate grooves 508.

Interposed between the first plate 478 of the ball and ramp assembly 444 and the pressure plate 470 is a second thrust bearing assembly 521. When assembled, at least a portion of the second thrust bearing 521 is disposed radially outboard from and is in direct contact with at least a portion of the shoulder portion 494 of the first pleat 478 of the ball and ramp assembly 444. In operation, at least a portion of the second thrust bearing 521 is in direct contact with the first plate 478 of the ball and ramp assembly 444 and pressure plate 470. The second thrust bearing assembly 521 allows for the transmission of force from the ball and ramp assembly 444 to the pressure plate 740 while allowing for relative rotation of the first plate 478 relative to the pressure plate 470.

Figure 6A:
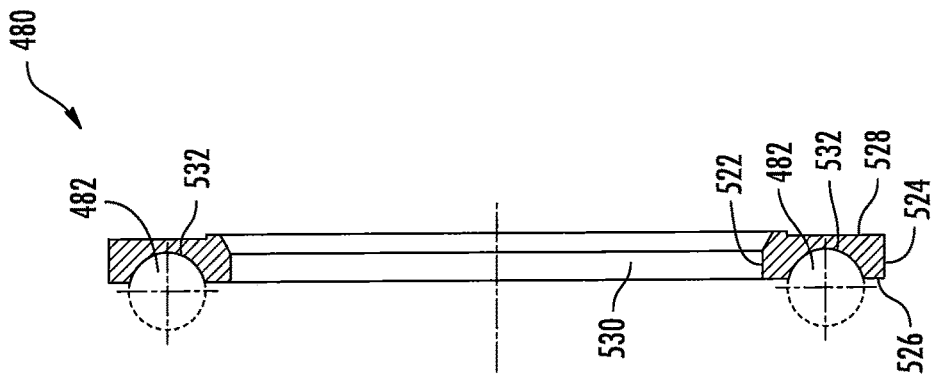
FIG. 6A is a schematic cross-sectional view of the second plate of the ball and ramp assembly illustrated in FIG. 6 along the line B-B.
Figure 6:
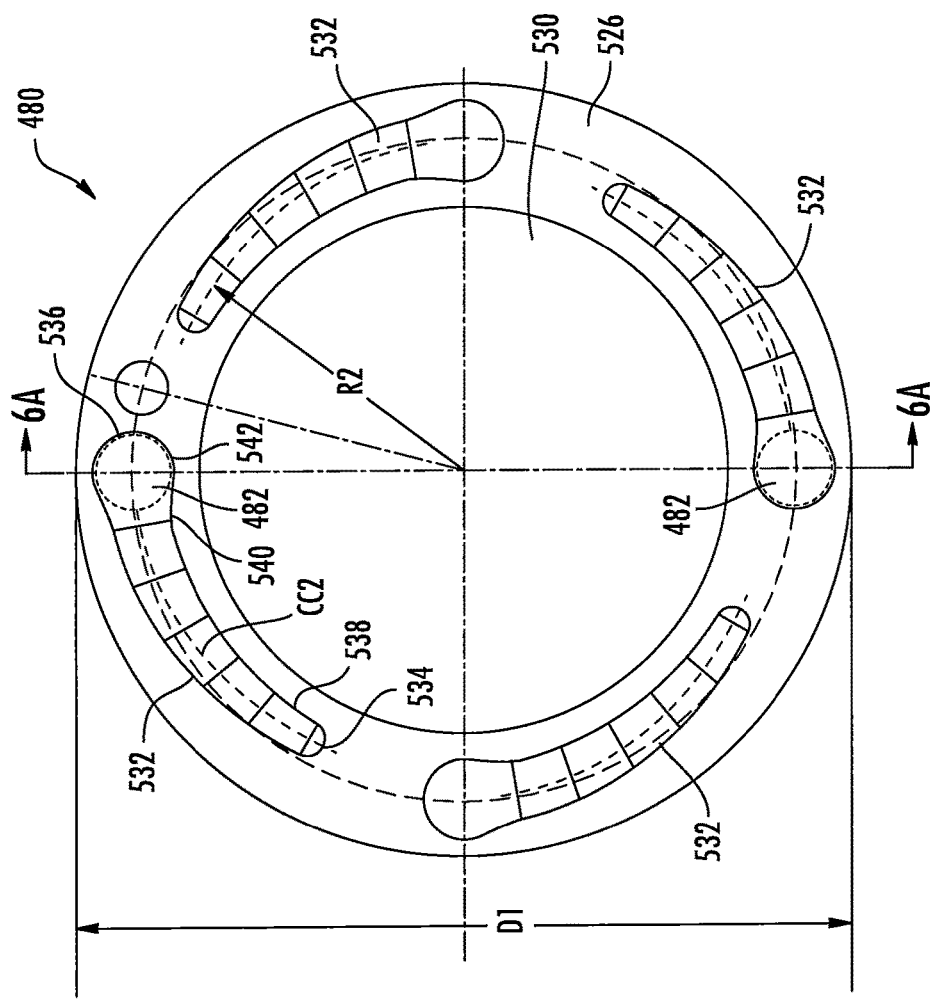
FIG. 6 is a schematic side-view of a second plate of the ball and assembly illustrated in FIGS. 3 and 4 according to an embodiment of the disclosure.
Figure 7:
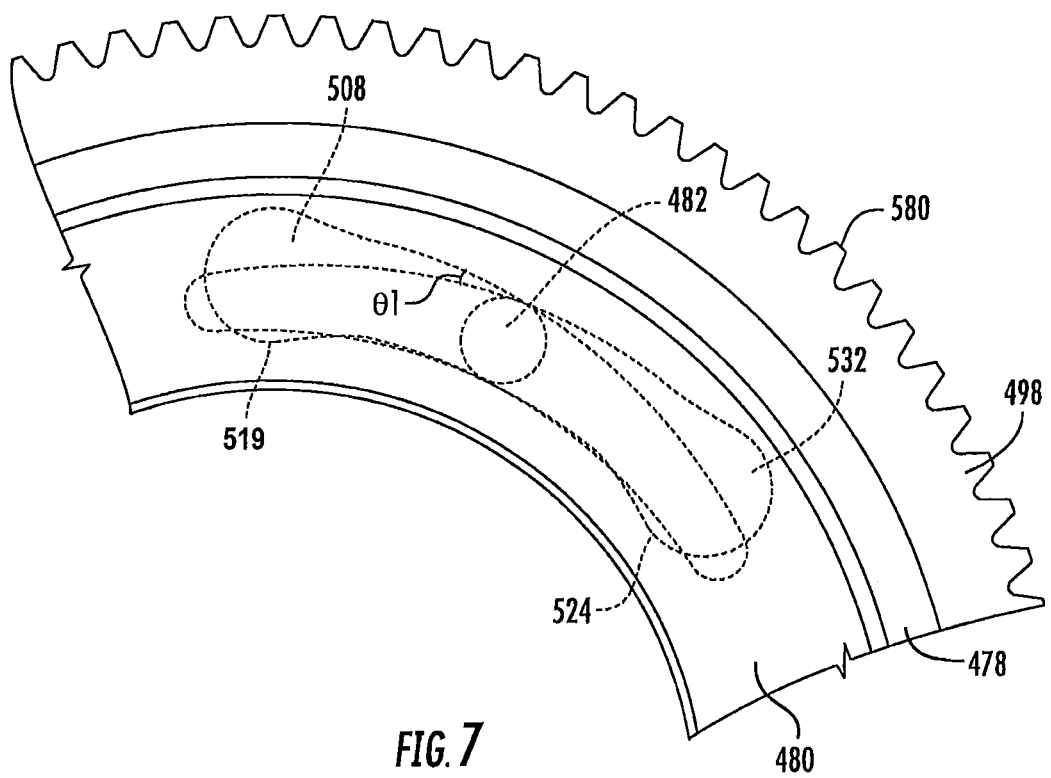
FIG. 7 is a schematic side-view of the first and second plates of the ball and ramp assembly illustrated in FIGS. 5-6A according to an embodiment of the disclosure.
Figure 8:
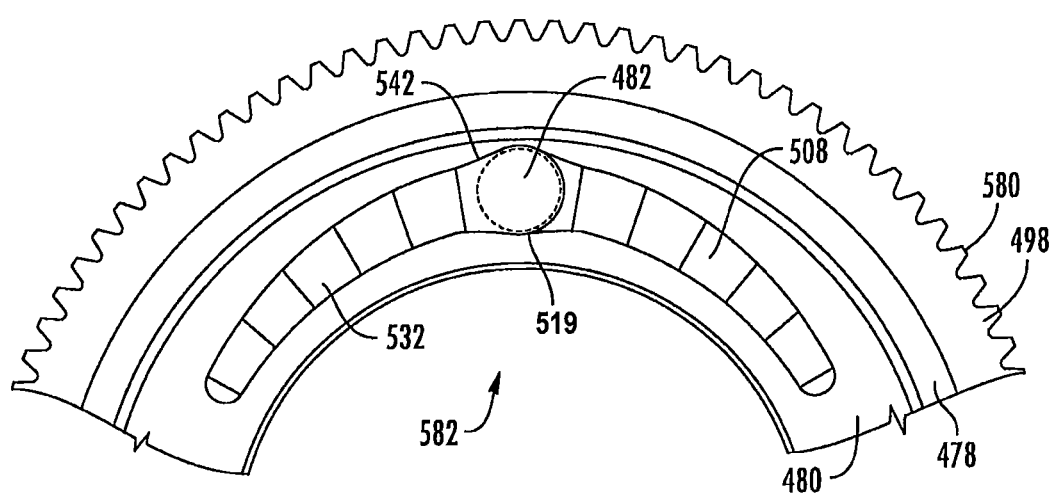
FIG. 8 is a schematic side-view of the first and second plates illustrated in FIGS. 5-7, when the ball and ramp assembly is in a first position.
Figure 9:
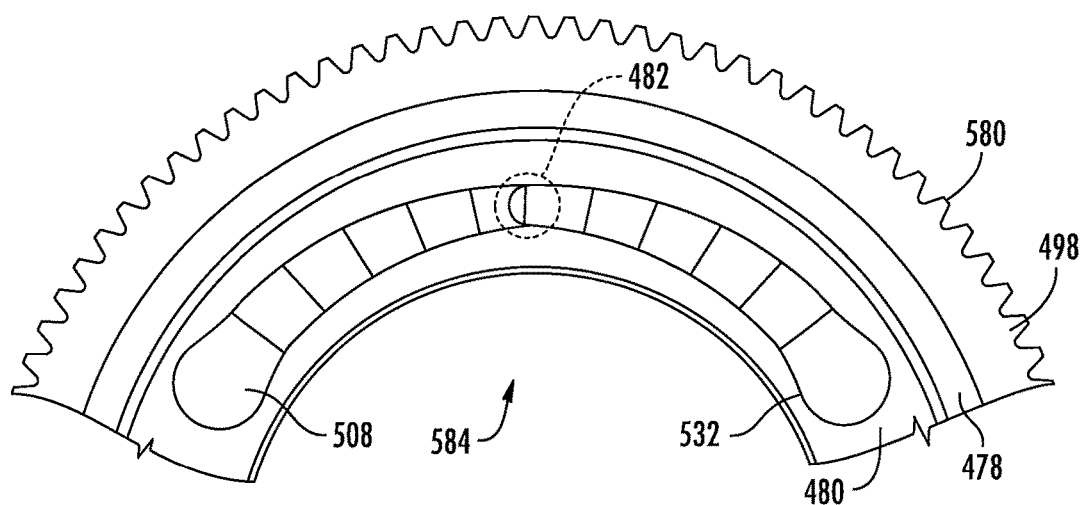
FIG. 9 is a schematic side-view of the first and second plates illustrated in FIGS. 5-8, when the ball and ramp assembly is in a second position.

Disposed at least partially axially inboard from the first plate 478 of the ball and ramp assembly 444 is the second plate 480 of the ball and ramp assembly 444. The second plate 480 of the ball and ramp assembly 444 has an inner surface 522, an outer surface 524, a first side 526 and a second side 528. The inner surface 522 and the outer surface 524 of the second plate 480 defines a hollow portion 530 therein. As illustrated in FIGS. 6 and 6A of the disclosure, the first plate 480 has one or more second plate grooves 532 with a variable depth that extend along at least a portion of the first side 526 of the second plate 480. The one or more second plate grooves 532 have a first end 534, a second end 536, first end portion 538 and a second end portion 540. As best seen in FIG. 7 of the disclosure, the one or more second plate grooves 532 on the first side 526 of the second plate 480 are a reverse mirror image of the one or more first plate grooves 508 on the substantially vertical wall portion 506 of the receiving portion 504 of the first plate 478.

In accordance with the embodiment of the disclosure illustrated in FIG. 5 and as a non-limiting example, the one or more second plate grooves 532 may have a variable width that increases from the first end portion 538 to the second end portion 540 of the one or more second plate grooves 532. Additionally, in accordance with an embodiment of the disclosure and as a non-limiting example, the depth of the one or more second plate grooves 532 may increase from the first end portion 538 to the second end portion 540 of the one or more second plate grooves 532.

As best seen in FIG. 6 and as a non-limiting example, the second end portion 540 of the one or more second plate grooves 532 has a substantially circular portion 542. The substantially circular portion 542 of the one or more second plate grooves 532 define a home or rest position for the one or more rolling elements of the ball and ramp assembly 444. According to an embodiment of the disclosure and as a non-limiting example, the substantially circular portion 542 of the one or more second plate grooves 532 has a diameter that is substantially equal to or slightly greater than an outer diameter of the one or more rolling elements 482 of the ball and ramp assembly 444.

Additionally, as best seen in FIG. 6 and as a non-limiting example, the one or more second plate grooves 532 have a non-circular shape. As illustrated in FIG. 6 of the disclosure, the one or more second plate grooves 532 have center of curvature CC2 with a radius R2 that increases from the first end portion 538 to the second end portion 540 of the one or more second plate grooves 532. It is within the scope of this disclosure and as a non-limiting example that the one or more second plate grooves 532 of the second plate 480 of the ball and ramp assembly 444 may have an elliptical-shape, a spiral-shape, an eccentric-shape and/or a non-circular shape with a radius that is defined by a general function (e.g. sinusoidal, polynomial, linear, piecewise continuous/multi-linear, logarithmic, etc.) of the angular location of the one or more second plate grooves 532.

In accordance with the embodiment of the disclosure illustrated in FIGS. 5 and 6 and as a non-limiting example, the first plate 478 may have a total of four first plate grooves 508 and the second plate 480 may have a total of four second plate grooves 532. As illustrated in FIGS. 5 and 6 of the disclosure and as a non-limiting example, the substantially circular portions 519 and 542 of the first and second plate grooves 508 and 532 in the first and second plates 478 and 480 are disposed equidistant from one another. It is within the scope of this disclosure and as a non-limiting example that the substantially circular portions 519 and 542 of the first and second plate grooves 508 and 532 may be disposed 90-degrees relative to on another along the same radius from the theoretical center of the first and second plates 478 and 480. According to yet another embodiment of the disclosure and as a non-limiting example, the substantially circular portions 519 and 542 of the first and second plate grooves 508 and 532 may be located approximately at the 0 degree, 90 degree, 180 degree and 270 degree locations.

As illustrated in FIG. 4 of the disclosure, at least a portion of the one or more rolling elements 482 of the ball and ramp assembly 444 are disposed within the one or more first plate grooves 508 on the first plate 478 and the one or more second plate grooves 532 on the second plate 480.

It is within the scope of this disclosure and as a non-limiting example, that the ball and ramp assembly 444 may further include the use of a cage 544 having a first side 546 and a second side 548. Extending from the first side 546 to the second side 548 of the cage 544 is one or more rolling element apertures 550. The one or more rolling element apertures 550 are of a size and shape to receive and/or retain one or more of the one or more rolling elements 482 of the ball and ramp assembly 444. The cage 544 is used to ensure that the one or more rolling elements 482 are disposed and retained in pre-determined locations in relation to one another between the first and second plates 478 and 480 of the ball and ramp assembly 444. Additionally, the cage 544 is used to aid in preventing a ball loss within the ball and ramp assembly 444 when the assembly 444 is in operation.

A motor 552 having a motor output shaft 554 is drivingly connected to the first plate 478 of the ball and ramp assembly 444 by using a set of gears 556. The motor 552 allows for the selective rotation of the first plate 478 of the ball and ramp assembly 444. As a non-limiting example, the motor 552 is an electric motor.

Integrally connected to at least a portion of an end of the motor output shaft 554 opposite the motor 553 is an input gear 558 having a plurality of gear teeth 560 that are circumferentially extending along at least a portion of an outer surface 562 of the input gear 556. According to an embodiment of the disclosure and as a non-limiting example, the input gear 558 may be integrally formed as part of the end of the motor output shaft 554 opposite the motor 553. In accordance with an alternative embodiment of the disclosure and as a non-limiting example, the input gear 558 of the gear set 556 may be integrally connected to the end of the motor output shaft 554 opposite the motor 552 by using one or more welds, one or more mechanical fasteners, one or more adhesives, a press-fit connection and/or a threaded connection.

Drivingly connected to an input gear 558 of the set of gears 556 is an intermediate gear 564 having an inner surface 566 and an outer surface 568. Circumferentially extending from at least a portion of the outer surface 568 of the intermediate gear 564 is a plurality of gear teeth 570. The plurality of gear teeth 570 on the outer surface 568 of the intermediate gear 564 are complementary to and meshingly engaged with the plurality of gear teeth 560 on the outer surface 562 of the input gear 556.

Integrally connected to at least a portion of the inner surface 566 of the intermediate gear 564 is a gear shaft 572. An end of the gear shaft 572, opposite the intermediate gear 564, is integrally connected to an output gear 574. According to an embodiment of the disclosure and as a non-limiting example, an end of the gear shaft 572, opposite the output gear 574, may be integrally formed as part of the intermediate gear 564 of the set of gears 556. In accordance with an alternative embodiment of the disclosure and as a non-limiting example, the end of the gear shaft 572, opposite the output gear 574, may be integrally connected to the inner surface 566 of the intermediate gear 564 by using one or more welds, one or more mechanical fasteners, one or more adhesives, a press-fit connection and/or a threaded connection.

Circumferentially extending from at least a portion of an outer surface 576 of the output gear 574 is a plurality of gear teeth 578. The plurality of gear teeth 578 on the outer surface 576 of the output gear 574 are complementary to and meshingly engaged with a plurality of gear teeth 580 circumferentially extending along at least a portion of the outer surface 502 of the first plate gear portion 498 of the first plate 478 of the ball and ramp assembly 444.

When the motor 552 is activated, it selectively rotates the first plate 478 of the ball and ramp assembly 444 a pre-determined amount. As the first plate 478 is rotated relative to the second plate 480, the one or more rolling elements 482 are translated along the one or more first and second plate grooves 508 and 532 from their home or first position 582 illustrated in FIG. 8 within the substantially circular portions 519 and 542 to a second position 584 illustrated in FIG. 9. As the one or more rolling elements 482 are translated up the incline of the one or more first and second plate grooves 508 and 532, from their first position 582 to the second position 584, the first plate 478 is translated axially away from the second plate 480 toward the clutch pack 410. Once the first plate 478 has translated axially a pre-determined amount of distance toward the clutch pack 410, the ball and ramp assembly 444 begins to apply an amount of force onto the first and second plurality of clutch plates 446 and 448.

As best seen in FIG. 7, as the one or more rolling elements 482 are translated along the one or more first and second plate grooves 508 and 532, the one or more rolling elements 482 are retained in their desired location by an angle θ1 between the one or more first and second plate grooves 508 and 532. The angle θ1 is a result of the non-circular shape of the one or more first and second plate grooves 508 and 532 in combination with the reverse mirror image orientation of the one or more first plate grooves 508 relative to the one or more second plate grooves 532. Due to the reverse mirror image orientation and the non-circular shape of the one or more first plate grooves 508 relative to the one or more second plate grooves 532, the one or more rolling elements 482 have a single location for every rotation of the first plate 478 of the ball and ramp assembly 444. As a result, the one or more rolling elements 482 are always positively or kinematically retained within their ideal operating position along the one or more first and second plate grooves 508 and 532 thereby preventing the occurrence of a ball loss condition within the ball and ramp assembly 444. This improves the overall operational efficiency of the clutch pack and ball and ramp assemblies 410 and 444. Additionally, this ensures that the ball and ramp assembly 444 is able to accurately apply a constant amount of force onto the clutch pack 410 at all locations across the one or more first and second plate grooves 508 and 532 for any amount of time. As a non-limiting example, the angle θ1 is from approximately 4 degrees to approximately 7 degrees.

In accordance with the embodiment of the disclosure illustrated in FIG. 4 of the disclosure, the first plate 478 is rotatable and the second plate 480 is stationary or static. According to an alternative embodiment of the disclosure (not shown) and as a non-limiting example, the first plate and the second plate of the ball and ramp assembly may be rotatable relative to one another. According to this embodiment of the disclosure, the second plate 480 may be drivingly connected to the motor 552 illustrated in FIG. 4 or the second plate 480 may be drivingly connected to a second motor (not shown). In accordance with an alternative embodiment of the disclosure (not shown) and as a non-limiting example, the first plate may be static or stationary and the second plate may be rotatable relative to the first plate and drivingly connected to the motor.

Figure 10:
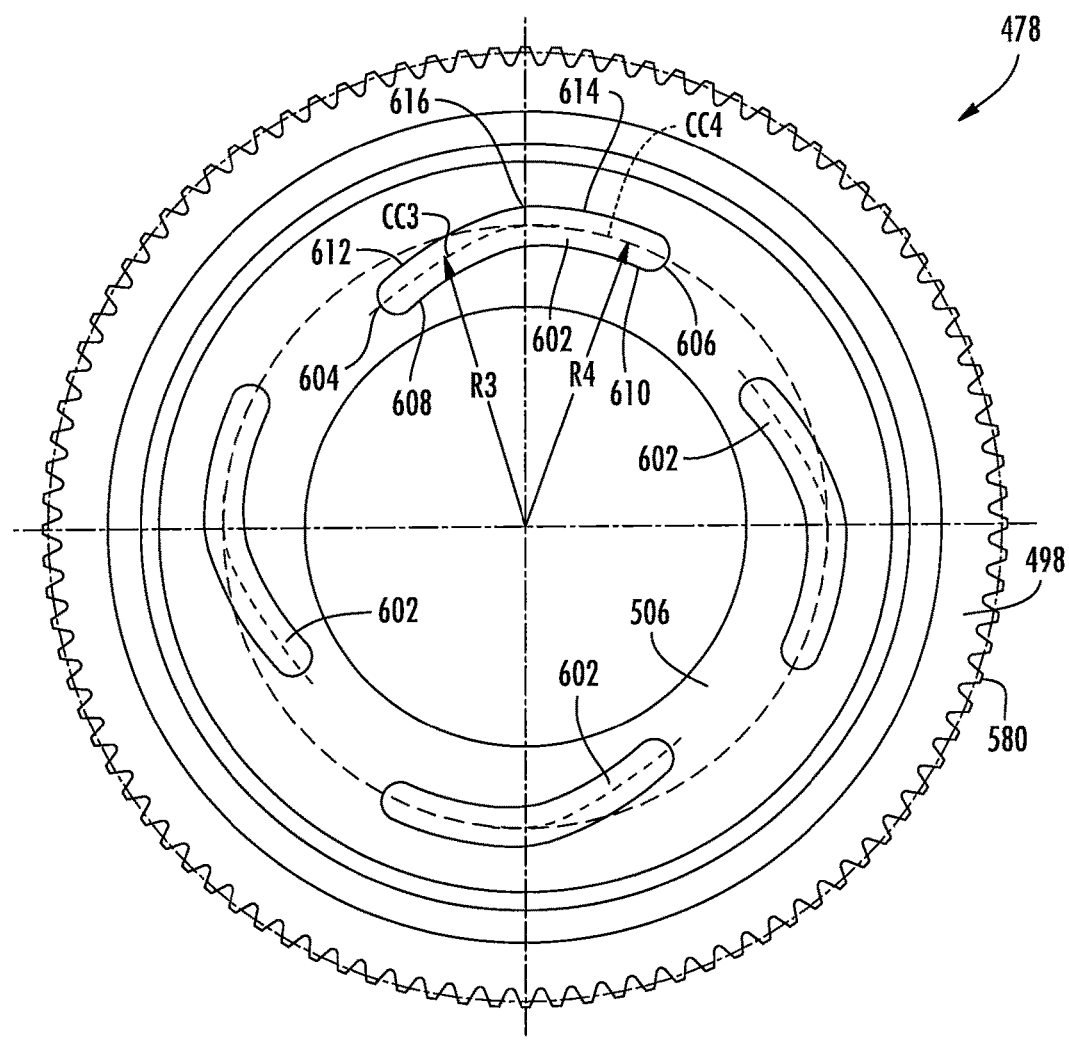
FIG. 10 is a schematic side view of a first plate of the ball and ramp assembly illustrated in FIGS. 3-5A and 7-9 according to an alternative embodiment of the disclosure.
Figure 11:
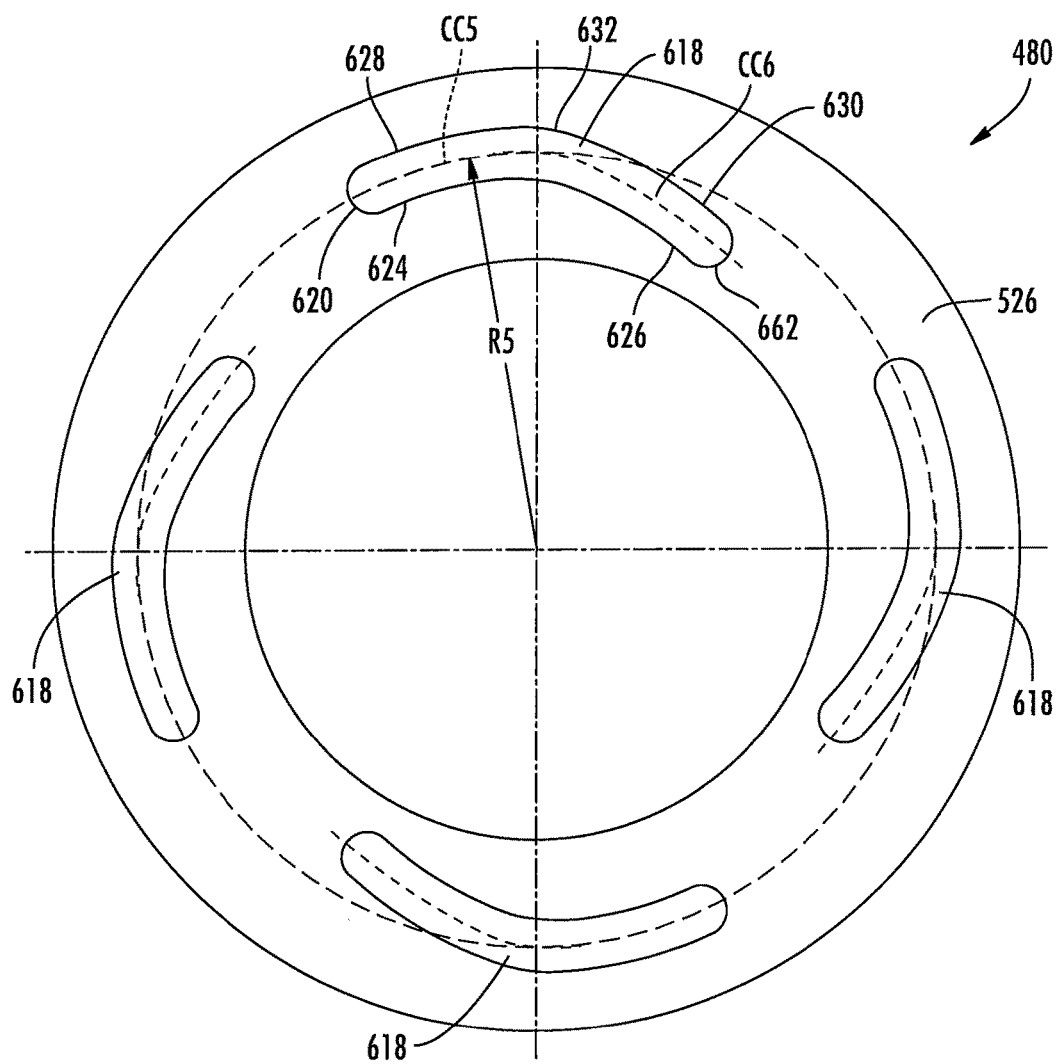
FIG. 11 is a schematic side-view of a second plate of the ball and ramp assembly illustrated in FIGS. 3, 4 and 6-9 according to an alternative embodiment of the disclosure.
Figure 12:
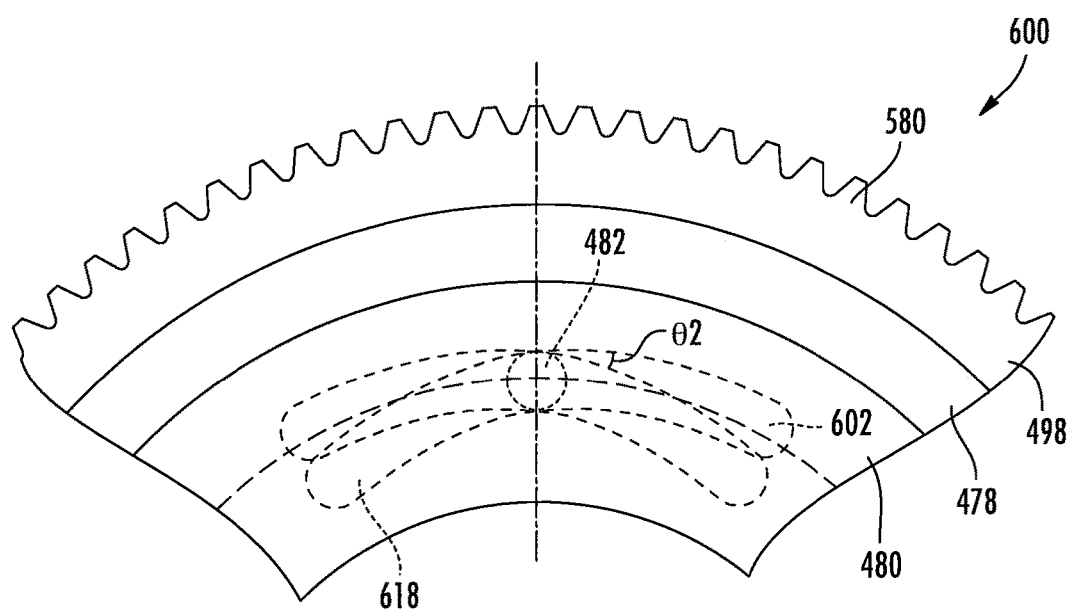
FIG. 12 is a schematic side-view of the first and second plates illustrated in FIGS. 10 and 11 according to an alternative embodiment of the disclosure.

FIGS. 10-12 schematically illustrate a portion of a ball and ramp assembly 600 according to an alternative embodiment of the disclosure. The ball and ramp assembly 600 illustrated in FIGS. 10-12 is the same as the ball and ramp assembly 444 illustrated in FIGS. 3-9, except where specifically noted below. As illustrated in FIG. 10 of the disclosure, the first plate 478 of the ball and ramp assembly 600 has one or more first plate grooves 602 extending along the substantially vertical portion 506 of the receiving portion 504 of the first plate 478. The one or more first plate grooves 602 have a first end 604, a second end 606, first end portion 608 and a second end portion 610. In accordance with the embodiment of the disclosure illustrated in FIG. 10 and as a non-limiting example, the one or more first plate grooves 602 of the first plate 478 have a constant width from the first end portion 608 to the second end portion 610 of the one or more first plate grooves 602. According to an alternative embodiment of the disclosure and as a non-limiting example, the one or more first plate grooves may have a variable width that either increases or decreases from the first end portion to the second end portion of the one or more first plate grooves of the first plate.

The depth of the one or more first plate grooves 602 of the first plate 478 of the ball and ramp assembly 600 changes from the first end portion 608 to the second end portion 620 of the one or more first plate grooves 602. According to an embodiment of the disclosure and as a non-limiting example, the depth of the one or more first plate grooves 602 of the first plate 478 may decrease from the first end portion 608 to the second end portion 610 of the one or more first plate grooves 602. In accordance with an alternative embodiment of the disclosure and as a non-limiting example, the depth of the one or more first plate grooves 602 of the first plate 478 may increase from the first end portion 608 to the second end portion 610 of the one or more first plate grooves 602.

As illustrated in FIG. 10 of the disclosure, the one or more first plate grooves 602 of the first plate 478 have a first portion 612, a second portion 614 and a transition portion 616 interposed between the first portion 612 and the second portion 614. In accordance with the embodiment of the disclosure illustrated in FIG. 10 of the disclosure, the first portion 612 of the one or more first plate grooves 602 have a non-circular shape. As best seen in FIG. 10 of the disclosure, the first portion 612 of the one or more first plate grooves 602 have a center of curvature CC3 with a radius R3 that increases from the first end 604 to the transition portion 616 of the one or more first plate grooves 602. It is within the scope of this disclosure and as a non-limiting example, that the first portion 612 of the one or more first plate grooves 602 of the first plate 478 may have an elliptical-shape, a spiral-shape, an eccentric-shape and/or a non-circular shape with a radius that is defined by a general function (e.g. sinusoidal, polynomial, linear, piecewise continuous/multilinear, logarithmic, etc.) of the angular location of the one or more first plate grooves 602.

The second portion 614 of the one or more first plate grooves 602 are substantially circular in shape. As illustrated in FIG. 10 and as a non-limiting example, the second portion 614 of the one or more first plate grooves 602 may have a center of curvature CC4 with a radius R4 that is constant from the transition portion 616 to the second end 606 of the one or more first plate grooves 602.

As best seen in FIG. 11 of the disclosure, the second plate 480 of the ball and ramp assembly 600 has one or more second plate grooves 618 extending along the first side 526 of the second plate 480 of the ball and ramp assembly 600. The one or more second plate grooves 618 have a first end 620, a second end 622, first end portion 624 and a second end portion 626. As best seen in FIG. 12 of the disclosure, the one or more second plate grooves 618 on the first side 526 of the second plate 480 are a reverse mirror image of the one or more first plate grooves 602 on the substantially vertical wall portion 506 of the receiving portion 504 of the first plate 478.

In accordance with the embodiment of the disclosure illustrated in FIG. 11 and as a non-limiting example, the one or more second plate grooves 618 of the second plate 480 have a constant width from the first end portion 624 to the second end portion 626 of the one or more second plate grooves 618. According to an alternative embodiment of the disclosure and as a non-limiting example, the one or more second plate grooves may have a variable width that either increases or decreases from the first end portion to the second end portion of the one or more second plate grooves of the second plate.

The depth of the one or more second plate grooves 618 of the second plate 480 of the ball and ramp assembly 600 changes from the first end portion 624 to the second end portion 626 of the one or more second plate grooves 618. According to an embodiment of the disclosure and as a non-limiting example, the depth of the one or more second plate grooves 618 of the second plate 480 may decrease from the first end portion 624 to the second end portion 626 of the one or more second plate grooves 618. In accordance with an alternative embodiment of the disclosure and as a non-limiting example, the depth of the one or more second plate grooves 618 of the second plate 480 may increase from the first end portion 624 to the second end portion 626 of the one or more second plate grooves 618.

As illustrated in FIG. 11 of the disclosure, the one or more second plate grooves 618 of the second plate 480 have a first portion 628, a second portion 630 and a transition portion 632 interposed between the first portion 628 and the second portion 630. In accordance with the embodiment of the disclosure illustrated in FIG. 11 of the disclosure, first portion 628 of the one or more second plate grooves 618 are substantially circular in shape. As a non-limiting example, the first portion 628 of the one or more second plate grooves 618 may have a center of curvature CC5 with a radius R5 that is constant from the first end 620 to the transition portion 632 of the one or more second plate grooves 618.

In accordance with the embodiment of the disclosure illustrated in FIG. 11 and as a non-limiting example, the second portion 630 of the one or more second plate grooves 618 has a non-circular shape. As best seen in FIG. 11 of the disclosure, the second portion 630 of the one or more second plate grooves 618 have a center of curvature CC6 with a radius R6 that decreases from the transition portion 632 to the second end 622 of the one or more second plate grooves 618. It is within the scope of this disclosure and as a non-limiting example, that the second portion 630 of the one or more second plate grooves 618 of the second plate 480 may have an elliptical-shape, a spiral-shape, an eccentric-shape and/or a non-circular shape with a radius that is defined by a (e.g. sinusoidal, polynomial, linear, piecewise continuous/multilinear, logarithmic, etc.) function of the angular location of the one or more second plate grooves 618.

As best seen in FIG. 12, as the one or more rolling elements 482 are translated along the one or more first and second plate grooves 602 and 618, the one or more rolling elements 482 are retained in their desired location by an angle $\theta 2$ between the one or more first and second plate grooves 602 and 618. The angle $\theta 2$ is a result of the non-circular shape of the first portion 612 and the second portion 630 of the first and second plates 478 and 480 in combination with the reverse mirror image orientation of the one or more first plate grooves 602 relative to the one or more second plate grooves 618. Due to the reverse mirror image orientation and the non-circular shape of the first portion 612 of the one or more first plate grooves 602 relative to the non-circular shape of the second portion 628 of the one or more second plate grooves 618, the one or more rolling elements 482 have a single location for every rotation of the first plate 478. As a result, the one or more rolling elements 482 are always positively or kinematically retained within their ideal operating position along the one or more first and second plate grooves 508 and 532 thereby preventing the occurrence of a ball loss condition within the ball and ramp assembly 444. This improves the overall operational efficiency of the clutch pack and ball and ramp assemblies 410 and 444. Additionally, this ensures that the ball and ramp assembly 444 is able to accurately apply a constant amount of force onto the clutch pack 410 at all locations across the one or more first and second plate grooves 602 and 618 for any amount of time. As a non-limiting example, the angle $\theta 2$ is from approximately 4 degrees to approximately 7 degrees.

According to an embodiment of the disclosure and as a non-limiting example, the first plate 478 may have a total of four first plate grooves 602 and the second plate 480 may have a total of four second plate grooves 618. As illustrated in FIGS. 10 and 11 of the disclosure and as a non-limiting example, the transition portions 616 and 632 of the first and second plate grooves 602 and 618 in the first and second plates 478 and 480 are disposed equidistant from one another. It is within the scope of this disclosure and as a non-limiting example that the transition portions 616 and 632 of the first and second plate grooves 602 and 618 may be disposed 90-degrees relative to on another along the same radius from the theoretical center of the first and second plates 478 and 480. According to yet another embodiment of the disclosure and as a non-limiting example, the transition portions 616 and 632 of the first and second plate grooves 602 and 608 may be located approximately at the 0 degree, 90 degree, 180 degree and 270 degree locations.

Figure 13:
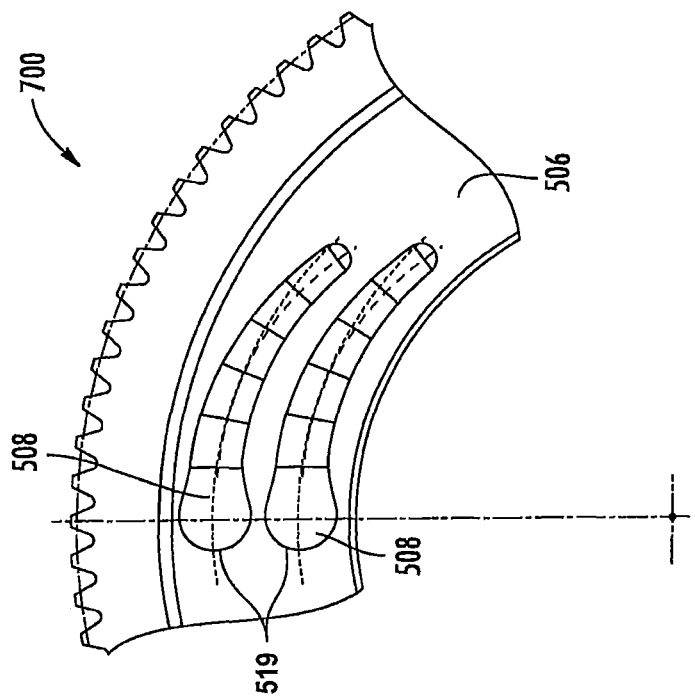
FIG. 13 is a partial schematic side-view of a first plate according to another embodiment of the disclosure.

FIG. 13 is a schematic side-view of a portion of a first plate 700 according to another embodiment of the disclosure. The first plate 700 illustrated in FIG. 13 is the same as the first plate 478 illustrated in FIGS. 3-5A and 7-9, except where specifically noted below. As illustrated in FIG. 13 of the disclosure, the first plate 700 has one or more first plate grooves 508 with substantially circular portions 519 that are disposed along one or more radii from a theoretical center of the first plate 700 on the substantially vertical wall portion 506 of the receiving portion 504. According to the embodiment of the disclosure illustrated in FIG. 13 and as a non-limiting example, the substantially circular portions 519 of the one or more first plate grooves 508 of the first plate 700 may be radially aligned with one another and disposed along one or more radii from the theoretical center of the first plate 700. In accordance with an alternative embodiment of the disclosure (not shown), the substantially circular portions of the one or more first plate grooves of the first plate may be radially off-set from one another and disposed along one or more radii from the theoretical center of the first plate.

Figure 14:
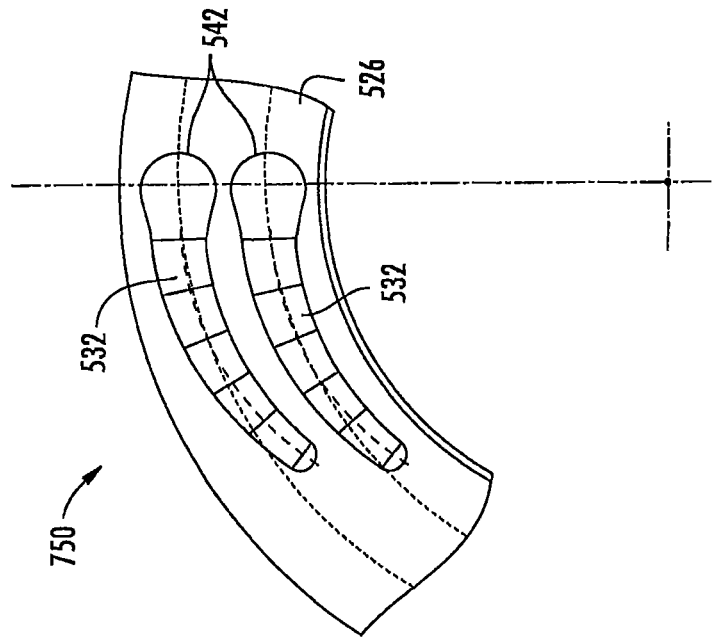
FIG. 14 is a partial schematic side-view of a second plate according to another embodiment of the disclosure.

FIG. 14 is a schematic side-view of a portion of a second plate 750 according to another embodiment of the disclosure. The second plate 750 illustrated in FIG. 14 is the same as the second plate 480 illustrated in FIGS. 3-4 and 6-9, except where specifically noted below. As illustrated in FIG. 14 of the disclosure, the second plate 750 has one or more second plate grooves 532 with substantially circular portions 542 that are disposed along one or more radii from the theoretical center of the second plate 750 on the first side 526 of the second plate 750. According to the embodiment of the disclosure illustrated in FIG. 14 and as a non-limiting example, the substantially circular portions 542 of the one or more second plate grooves 532 of the second plate 750 may be radially aligned with one another and disposed along one or more radii from the theoretical center of the second plate 750. In accordance with an alternative embodiment of the disclosure (not shown), the substantially circular portions of the one or more second plate groves of the second plate may be radially off-set from one another and disposed along one or more radii from the theoretical center of the second plate.

Figure 15:
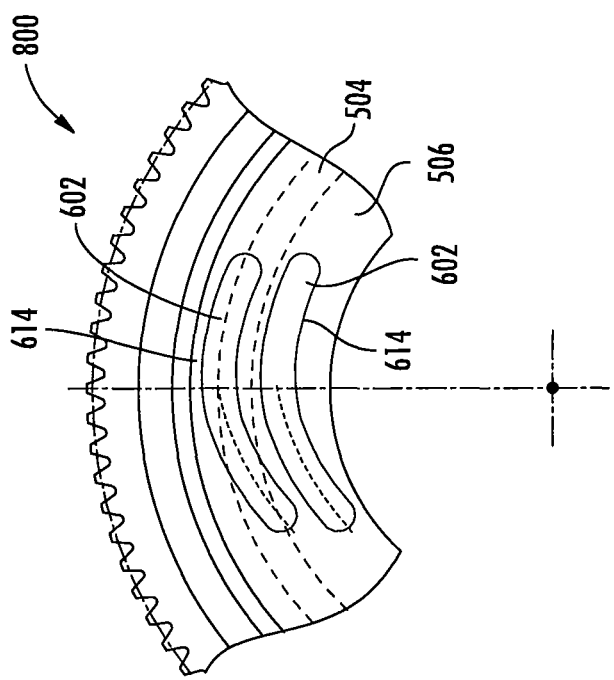
FIG. 15 is a partial schematic side-view of a first plate according to yet another embodiment of the disclosure.

FIG. 15 is a schematic side-view of a portion of a first plate 800 according to yet another embodiment of the disclosure. The first plate 800 illustrated in FIG. 15 is the same as the first plate 478 illustrated in FIGS. 10 and 12, except where specifically noted below. As illustrated in FIG. 15 of the disclosure, the first plate 800 has one or more first plate grooves 602 with second portions 614 that are disposed along one or more radii from the theoretical center of the first plate 800 on the substantially vertical wall portion 506 of the receiving portion 504. According to the embodiment of the disclosure illustrated in FIG. 15 and as a non-limiting example, the second portions 614 of the one or more first plate grooves 602 of the first plate 800 may be radially aligned with one another and disposed along one or more radii from the theoretical center of the first plate 800. In accordance with an alternative embodiment of the disclosure (not shown), the second portions of the one or more first plate grooves of the first plate may be radially off-set from one another and disposed along one or more radii from the theoretical center of the first plate.

Figure 16:
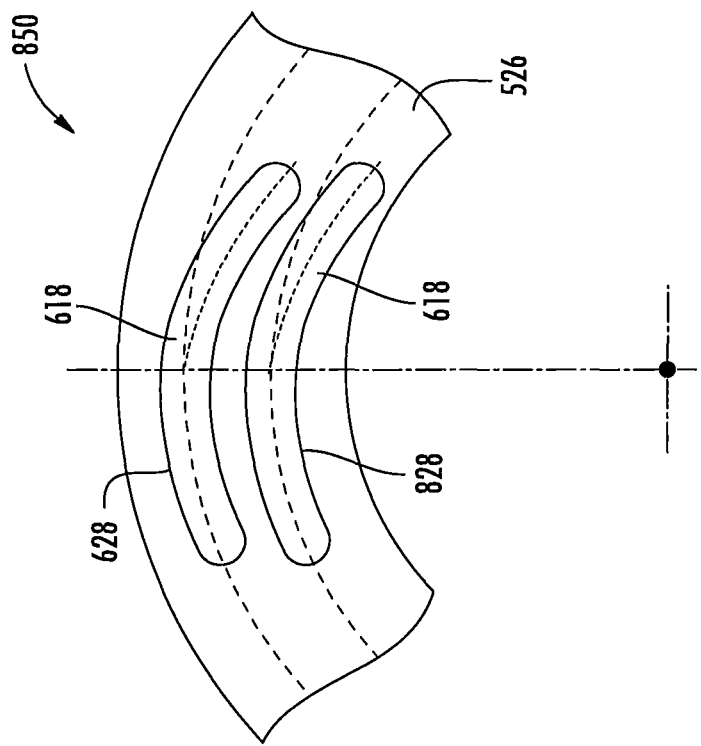
FIG. 16 is a partial schematic side-view of a second plate according to yet another embodiment of the disclosure.

FIG. 16 is a schematic side-view of a portion of a second plate 850 according to yet another embodiment of the disclosure. The second plate 850 illustrated in FIG. 16 is the same as the second plate illustrated in FIGS. 11 and 12, except where specifically noted below. As illustrated in FIG. 16 of the disclosure, the second plate 850 has one or more second plate grooves 618 with first portions 628 that are disposed along one or more radii from the theoretical center of the second plate 850 on the first side 526 of the second plate 850. According to the embodiment of the disclosure illustrated in FIG. 16 and as a non-limiting example, the first portions 628 of the one or more second plate grooves 618 of the second plate 850 may be radially aligned with one another and disposed along one or more radii from the theoretical center of the second plate 850. In accordance with an alternative embodiment of the disclosure (not shown), the first portions of the one or more second plate grooves of the second plate may be radially off-set from one another and disposed along one or more radii from the theoretical center of the second plate.

Figure 17:
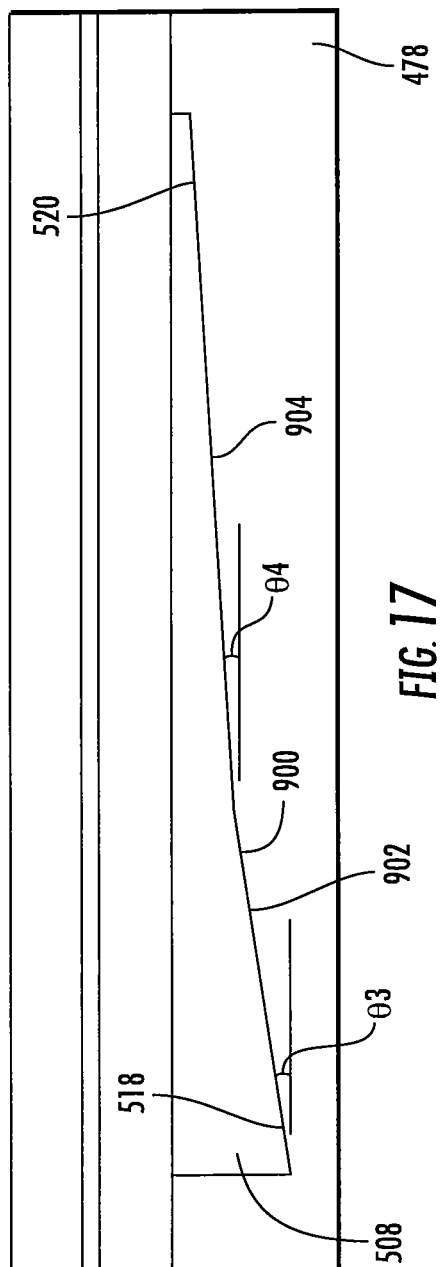
FIG. 17 schematically illustrates the depth of the one or more first plate grooves of the first plate illustrated in FIGS. 3-5A and 7-9 according to an embodiment of the disclosure.
Figure 18:
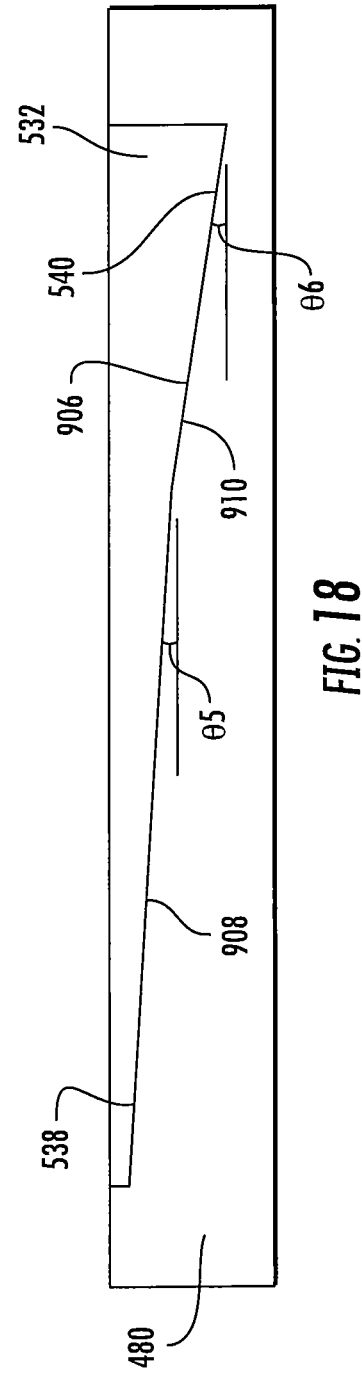
FIG. 18 schematically illustrates the depth of the one or more second plate grooves of the second plate illustrated in FIGS. 3, 4 and 6-9 according to an embodiment of the disclosure.

FIGS. 17 and 18 schematically illustrates the depth of the one or more first and second plate grooves 508 and 532 of the first and second plates 478 and 480 illustrated in FIGS. 3-9 according to an embodiment of the disclosure. The one or more first plate grooves 508 of the first plate 478 have a bottom 900 that inclines from the first end portion 518 to the second end portion 520 of the one or more first plate grooves 508. According to the embodiment of the disclosure illustrated in FIG. 17 and as a non-limiting example, the bottom 900 of the one or more first plate grooves 508 has a first portion 902 and a second portion 904. In accordance with the embodiment of the disclosure illustrated in FIG. 17, the first portion 902 of the bottom 900 of the one or more first plate grooves 508 is the low load or low force region of the one or more first plate grooves 508 of the first plate 478. In this region of the one or more first plate grooves 508, the ball and ramp assembly 444 is applying zero and/or a relatively low amount of force onto the clutch pack 410 of the axle system 300. The second portion 904 of the one or more first plate grooves 508 is the high load or high force region of the one or more first plate grooves 508 of the first plate 478. In this region of the one or more first plate grooves 508, the ball and ramp assembly 444 is applying a relatively high amount of force onto the clutch pack 410 of the axle system 300.

As best seen in FIG. 17 of the disclosure, the first portion 902 of the bottom 900 of the one or more first plate grooves 508 has a first angle of inclination θ3 and the second portion 904 of the bottom portion 900 has a second angle of inclination θ4. In accordance with the embodiment of the disclosure illustrated in FIG. 17 and as a non-limiting example, the first angle of inclination θ3 is greater than the second angle of inclination θ4 of the bottom 900 of the one or more first plate grooves 508. By making the first angle of inclination θ3 of the first portion 902 greater than the second angle of inclination θ4 of the second portion 904, the ball and ramp assembly 444 is able to quickly reach a point where the assembly 444 is applying an amount of force onto the clutch pack 410 of the axle system 300. Additionally, by making the second angle of inclination θ4 of the second portion 904 less than the first angle of inclination θ3 of the first portion 902, the ball and ramp assembly 444 is able to accurately apply a pre-determined amount of force onto the clutch pack 410 for any position of the motor 552.

The one or more second plate grooves 532 of the second plate 480 have a bottom 906 that declines from the first end portion 538 to the second end portion 540 of the one or more second plate grooves 532. According to the embodiment of the disclosure illustrated in FIG. 18 and as a non-limiting example, the bottom 906 of the one or more second plate grooves 532 has a first portion 908 and a second portion 910. In accordance with the embodiment of the disclosure illustrated in FIG. 18, the first portion 908 of the bottom 906 of the one or more second plate grooves 532 is the high load or high force region of the one or more second plate grooves 532 of the second plate 480. In this region of the one or more second plate grooves 532, the ball and ramp assembly 444 is applying a relatively high amount of force onto the clutch pack 410 of the axle system 300. The second portion 910 of the one or more second plate grooves 532 is the low load or low force region of the one or more second plate grooves 532 of the second plate 480. In this region of the one or more second plate grooves 532, the ball and ramp assembly 444 is applying zero and/or a relatively low amount of force onto the clutch pack 410 of the axle system 300.

As best seen in FIG. 18 of the disclosure, the first portion 908 of the bottom 906 of the one or more second plate grooves 532 has a first angle of inclination θ5 and the second portion 910 of the bottom 906 has a second angle of inclination θ6. In accordance with the embodiment of the disclosure illustrated in FIG. 18 and as a non-limiting example, the first angle of inclination θ5 is less than the second angle of inclination θ6 of the bottom 906 of the one or more second plate grooves 532. By making the second angle of inclination θ6 of the second portion 910 greater than the first angle of inclination θ5 of the first portion 908, the ball and ramp assembly 444 is able to quickly reach a point where the assembly 444 is applying an amount of force onto the clutch pack 410 of the axle system 300. Additionally, by making the first angle of inclination θ5 of the first portion 908 less than the second angle of inclination θ6 of the second portion 910, the ball and ramp assembly 444 is able to accurately apply a pre-determined amount of force onto the clutch pack 410 for any position of the motor 552.

FIGS. 19 and 20 schematically illustrates the depth of the one or more first and second plate grooves 602 and 618 of the first and second plates 478 and 480 illustrated in FIGS. 10-12 according to an embodiment of the disclosure. The one or more first plate grooves 602 of the first plate 478 have a bottom 950 that inclines from the first end portion 608 to the second end portion 610 of the one or more first plate grooves 602. According to the embodiment of the disclosure illustrated in FIG. 19 and as a non-limiting example, the bottom 950 of the one or more first plate grooves 602 has a first portion 952 and a second portion 954. In accordance with the embodiment of the disclosure illustrated in FIG. 19, the first portion 952 of the bottom 950 of the one or more first plate grooves 602 is the low load or low force region of the one or more first plate grooves 602 of the first plate 478. In this region of the one or more first plate grooves 602, the ball and ramp assembly 444 is applying zero and/or a relatively low amount of force onto the clutch pack 410 of the axle system 300. The second portion 954 of the one or more first plate grooves 602 is the high load or high force region of the one or more first plate grooves 602 of the first plate 478. In this region of the one or more first plate grooves 602, the ball and ramp assembly 444 is applying a relatively high amount of force onto the clutch pack 410 of the axle system 300.

In accordance with an embodiment of the disclosure (not shown), the first portion of the bottom of the one or more first plate grooves is the high load or high force region of the one or more first plate grooves and the second portion of the bottom of the one or more first plate grooves is the low load or low force region of the one or more first plate grooves.

As best seen in FIG. 19 of the disclosure, the first portion 952 of the bottom 950 of the one or more first plate grooves 602 has a first angle of inclination θ7 and the second portion 954 of the bottom portion 950 has a second angle of inclination θ8. According with the embodiment of the disclosure illustrated in FIG. 19 and as a non-limiting example, the first angle of inclination θ7 is greater than the second angle of inclination θ8 of the bottom 950 of the one or more first plate grooves 602. By making the first angle of inclination θ7 of the first portion 952 greater than the second angle of inclination θ8 of the second portion 954, the ball and ramp assembly 444 is able to quickly reach a point where the assembly 444 is applying an amount of force onto the clutch pack 410 of the axle system 300. Additionally, by making the second angle of inclination θ8 of the second portion 954 less than the first angle of inclination θ7 of the first portion 952, the ball and ramp assembly 444 is able to accurately apply a pre-determined amount of force onto the clutch pack 410 for any position of the motor 552.

The one or more second plate grooves 618 of the second plate 480 have a bottom 956 that declines from the first end portion 624 to the second end portion 626 of the one or more second plate grooves 618. According to the embodiment of the disclosure illustrated in FIG. 20 and as a non-limiting example, the bottom 956 of the one or more second plate grooves 618 has a first portion 958 and a second portion 960. In accordance with the embodiment of the disclosure illustrated in FIG. 20, the first portion 958 of the bottom 956 of the one or more second plate grooves 618 is the high load or high force region of the one or more second plate grooves 618 of the second plate 480. In this region of the one or more second plate grooves 618, the ball and ramp assembly 444 is applying a relatively high amount of force onto the clutch pack 410 of the axle system 300. The second portion 960 of the one or more second plate grooves 618 is the low load or low force region of the one or more second plate grooves 618 of the second plate 480. In this region of the one or more second plate grooves 618, the ball and ramp assembly 444 is applying zero and/or a relatively low amount of force onto the clutch pack 410 of the axle system 300.

In accordance with an embodiment of the disclosure (not shown), the first portion of the bottom of the one or more first plate grooves is the low load or low force region of the one or more second plate grooves and the second portion of the bottom of the one or more second plate grooves is the high load or high force region of the one or more second plate grooves.

As best seen in FIG. 20 of the disclosure, the first portion 958 of the bottom 956 of the one or more second plate grooves 618 has a first angle of inclination θ9 and the second portion 960 of the bottom portion 956 has a second angle of inclination θ10. In accordance with the embodiment of the disclosure illustrated in FIG. 20 and as a non-limiting example, the first angle of inclination θ9 is less than the second angle of inclination θ10 of the bottom 956 of the one or more second plate grooves 618. By making the second angle of inclination θ10 of the second portion 960 greater than the first angle of inclination θ9 of the first portion 958, the ball and ramp assembly 444 is able to quickly reach a point where the assembly 444 is applying an amount of force onto the clutch pack 410 of the axle system 300. Additionally, by making the first angle of inclination θ9 of the first portion 958 less than the second angle of inclination θ10 of the second portion 960, the ball and ramp assembly 444 is able to accurately apply a pre-determined amount of force onto the clutch pack 410 for any position of the motor 552.

It is within the scope of this disclosure that the various embodiments of the disclosure described and illustrated herein may be combined with one another to make a ball and ramp assembly according to an embodiment of the disclosure.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A ball and ramp assembly, comprising:
a first plate having one or more first plate grooves, a first side, a second side, an inner surface and an outer surface;
   wherein said one or more first plate grooves have a first end portion and a second end portion;
   wherein said one or more first plate grooves are non-circular in shape and are in a first plane defined by said first plate;
   wherein a shoulder portion circumferentially extends from at least a portion of said first side of said first plate;
   wherein an increased diameter portion circumferentially extends along at least a portion of said outer surface of said first plate;
   wherein said first plate has a first plate gear portion having a plurality of gear teeth;
   wherein at least a portion of said first plate gear portion is integrally connected to or integrally formed as part of at least a portion of at least one of said outer surface and said increased diameter portion of said first plate;
   wherein at least a portion of a thrust bearing is in direct contact with at least a portion of said shoulder portion of said first plate;
a second plate having one or more second plate grooves;
   wherein the one or more second plate grooves have a first end portion and a second end portion;
   wherein said one or more second plate grooves of said second plate are a reverse mirror image of said one or more first plate grooves of said first plate;
one or more rolling elements;
   wherein at least a portion of said one or more rolling elements are disposed within said one or more first plate grooves of said first plate and said one or more second plate grooves of said second plate; and
   wherein said one or more rolling elements are retained within said one or more first and second plate grooves by an angle θ1 between said one or more first and second plate grooves, wherein said angle θ1 between said one or more first plate grooves and said one or more second plate grooves is determined in a second plane oriented in parallel to said first plate and said second plate and wherein said angle θ1 is a result of said non-circular shape of said one or more first and second plate grooves in combination with said reverse mirror image orientation of said one or more first plate grooves relative to said one or more second plate grooves.

2. The ball and ramp assembly of claim 1, further comprising a cage having a first side and a second side;
   wherein at least a portion of said cage is interposed between said first plate and said second plate;
   wherein said cage has one or more rolling element apertures extending from said first side to said second side of said cage; and
   wherein said one or more rolling element apertures are of a size and shape to, one or more of, receive and retain at least another portion of said one or more rolling elements.

3. The ball and ramp assembly of claim 1, wherein a length of said first end portion of said one or more first plate grooves has a substantially circular portion;
   wherein a length of said second end portion of said one or more second plate grooves has a substantially circular portion.

4. The ball and ramp assembly of claim 3, wherein said substantially circular portion of said one or more first plate grooves are disposed along one or more radii from a theoretical center of said first plate; and
   wherein said substantially circular portion of said one or more second plate grooves are disposed along one or more radii from a theoretical center of said second plate.

5. The ball and ramp assembly of claim 4, wherein said substantially circular portion of said one or more first plate grooves are spaced approximately 90 degrees from each other along said first plate; and
   wherein said substantially circular portion of said one or more second plate grooves are spaced approximately 90 degrees from each other along said second plate.

6. The ball and ramp assembly of claim 1, wherein said one or more first plate grooves have a width that decreases from said first end portion to said second end portion of said one or more first plate grooves; and
   wherein said one or more second plate grooves have a width that increases from said first end portion to said second end portion of said one or more second plate grooves.

7. The ball and ramp assembly of claim 1, wherein said one or more first plate grooves have a bottom with a first portion and a second portion
   wherein said first portion of said bottom of said one or more first plate grooves defines a low force region of said one or more first plate grooves and said second portion of said bottom of said one or more first plate grooves defines a high force region of said one or more first plate grooves;
   wherein said first portion of said bottom of said one or more first plate grooves has a first angle of inclination and said second portion of said bottom of said one or more first plate grooves has a second angle of inclination;
   wherein said first angle of inclination of said bottom of said first portion of said one or more first plate grooves is greater than said second angle of inclination of said bottom of said second portion of said one or more first plate grooves;
   wherein said one or more second plate grooves have a bottom with a first portion and a second portion;
   wherein said first portion of said bottom of said one or more second plate grooves defines a high force region of said one or more second plate grooves and said second portion of said bottom of said one or more second plate grooves defines a low force region of said one or more second plate grooves;
   wherein said first portion of said bottom of said one or more second plate grooves has a first angle of inclination and said second portion of said bottom of said one or more second plate grooves has a second angle of inclination; and
   wherein said first angle of inclination of said bottom of said first portion of said one or more second plate grooves is less than said second angle of inclination of said bottom of said second portion of said one or more second plate grooves.

8. The ball and ramp assembly of claim 1, further comprising a pressure plate;
   wherein said pressure plate is interposed between a clutch pack and a second thrust bearing;
   wherein said pressure plate has a plurality of protrusions circumferentially extending along at least a portion of an outer surface of said pressure plate; and wherein said plurality of protrusions on said outer surface of said pressure plate are complementary to a plurality of axially extending grooves circumferentially extending along at least a portion of an inner surface of a clutch drum of said clutch pack.

9. The ball and ramp assembly of claim 1, wherein said one or more first plate grooves have a radius R1 that is defined by a logarithmic function of an angular location of said one or more first plate grooves; and wherein said one or more second plate grooves have a radius R2 that is defined by a logarithmic function of an angular location of said one or more second plate grooves.

10. The ball and ramp assembly of claim 1, wherein said one or more first plate grooves have a first portion, a second portion and a transition portion interposed between said first and second portions of said one or more first plate grooves;

wherein at least a portion of a length of said first portion of said one or more first plate grooves has a non-circular shape;

wherein at least a portion of a length of said second portion of said one or more first plate grooves has a substantially circular shape;

wherein said one or more second plate grooves have a first portion, a second portion and a transition portion interposed between said first and second portions of said one or more second plate grooves;

wherein at least a portion of a length of said first portion of said one or more second plate grooves has a substantially circular shape; and wherein at least a portion of a length of said second portion of said one or more second plate grooves has a non-circular shape.

11. The ball and ramp assembly of claim 10, wherein said first portion of said one or more first plate grooves have a radius that is defined by a logarithmic function of an angular location of said one or more first plate grooves; and wherein said second portion of said one or more second plate grooves have a radius that is defined by a logarithmic function of an angular location of said one or more second plate grooves.

12. The ball and ramp assembly of claim 10, wherein said second portion of said one or more first plate grooves are disposed along one or more radii from a theoretical center of said first plate; and wherein said first portion of said one or more second plate grooves are disposed along one or more radii from a theoretical center of said second plate.

13. The ball and ramp assembly of claim 12, wherein said transition portion of said one or more first plate grooves are spaced 90 degrees from each other along said first plate; and wherein said transition portion of said one or more second plate grooves are spaced 90 degrees from each other along said second plate.

14. The ball and ramp assembly of claim 10, wherein said one or more first plate grooves have a bottom with a first portion and a second portion;

wherein said first portion of said bottom of said one or more first plate grooves defines a low force region of said one or more first plate grooves and said second portion of said bottom of said one or more first plate grooves defines a high force region of said one or more first plate grooves;

wherein said first portion of said bottom of said one or more first plate grooves has a first angle of inclination and said second portion of said bottom of said one or more first plate grooves has a second angle of inclination;

wherein said first angle of inclination of said bottom of said first portion of said one or more first plate grooves is greater than said second angle of inclination of said bottom of said second portion of said one or more first plate grooves;

wherein said one or more second plate grooves have a bottom with a first portion and a second portion;

wherein said first portion of said bottom of said one or more second plate grooves defines a high force region of said one or more second plate grooves and said second portion of said bottom of said one or more second plate grooves defines a low force region of said one or more second plate grooves;

wherein said first portion of said bottom of said one or more second plate grooves has a first angle of inclination and said second portion of said bottom of said one or more second plate grooves has a second angle of inclination; and wherein said first angle of inclination of said bottom of said first portion of said one or more second plate grooves is less than said second angle of inclination of said bottom of said second portion of said one or more second plate grooves.

* * * * *